US012782108B2

(12) United States Patent
Jin et al.

(10) Patent No.: US 12,782,108 B2
(45) Date of Patent: Nov. 3, 2026

(54) SEMICONDUCTOR MEASUREMENT APPARATUS

(71) Applicant: Samsung Electronics Co., Ltd., Suwon-si (KR)

(72) Inventors: Younguk Jin, Suwon-si (KR); Wookrae Kim, Suwon-si (KR); Jinseob Kim, Suwon-si (KR); Jinyong Kim, Suwon-si (KR); Garam Choi, Suwon-si (KR); Daehoon Han, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 62 days.

(21) Appl. No.: 18/403,801

(22) Filed: Jan. 4, 2024

(65) Prior Publication Data

US 2025/0012556 A1 Jan. 9, 2025

(30) Foreign Application Priority Data

Jun. 5, 2023 (KR) ........................ 10-2023-0072170

(51) Int. Cl.
*G01B 9/02* (2022.01)
*G01B 9/02001* (2022.01)
*G01B 9/02056* (2022.01)

(52) U.S. Cl.
CPC ..... *G01B 9/02044* (2013.01); *G01B 9/02007* (2013.01); *G01B 9/02058* (2013.01)

(58) Field of Classification Search
CPC ............ G01B 9/02044; G01B 9/02007; G01B 9/02058; G01B 2210/56; G01B 11/00;
(Continued)

(56) References Cited

U.S. PATENT DOCUMENTS

2009/0128827 A1 5/2009 De et al.
2015/0285735 A1* 10/2015 Wang .................. G01N 21/956 356/369

(Continued)

FOREIGN PATENT DOCUMENTS

CN 114295212 A * 4/2022
CN 116007906 A * 4/2023

(Continued)

*Primary Examiner* — Michael A Lyons
*Assistant Examiner* — Alexandria Mendoza
(74) *Attorney, Agent, or Firm* — Wolf, Greenfield & Sacks, P.C.

(57) ABSTRACT

A semiconductor measurement apparatus includes lighting unit; a light receiving unit; and a control unit configured to: generate a prediction equation representing the original image, where the prediction equation is based on a plurality of elements of a Mueller matrix, approximate each of the plurality of elements of the Mueller matrix to a polynomial including bases of a Zernike polynomial and coefficients, generate optimization coefficients based on a sum of the coefficients and a difference between the prediction equation and the original image, determine whether an optimization condition is satisfied based on the optimization coefficients and a minimum value, and select a dimension based on the optimization coefficients and the bases when the optimization condition is satisfied.

20 Claims, 25 Drawing Sheets

(58) Field of Classification Search
CPC .... G01N 21/211; G01N 21/45; H10P 74/203; G03F 7/70625; G06F 17/10
See application file for complete search history.

(56) References Cited

U.S. PATENT DOCUMENTS

| | | | | |
|---|---|---|---|---|
| 2015/0323471 | A1 | 11/2015 | Sapiens et al. | |
| 2016/0161245 | A1 | 6/2016 | Fu et al. | |
| 2017/0191945 | A1 * | 7/2017 | Zhang | G06T 7/001 |
| 2021/0156790 | A1 | 5/2021 | Hidaka | |
| 2021/0242060 | A1 * | 8/2021 | Krishnan | G01N 21/9501 |
| 2022/0003535 | A1 | 1/2022 | Hidaka | |
| 2022/0074848 | A1 | 3/2022 | Jung et al. | |
| 2023/0000343 | A1 | 1/2023 | Kim et al. | |
| 2023/0109008 | A1 * | 4/2023 | McGahan | G03F 7/70625 356/252 |

FOREIGN PATENT DOCUMENTS

| | | | | | |
|---|---|---|---|---|---|
| CN | 116182700 | A | * | 5/2023 | G01B 11/00 |
| JP | H08210972 | A | * | 8/1996 | |
| KR | 20210065007 | A | | 6/2021 | |
| KR | 20210109050 | A | | 9/2021 | |
| KR | 20220004544 | A | | 1/2022 | |
| KR | 20220032922 | A | | 3/2022 | |
| KR | 20230003886 | A | | 1/2023 | |
| WO | 2020154152 | A1 | | 7/2020 | |

* cited by examiner

SEMICONDUCTOR MEASUREMENT APPARATUS

CROSS-REFERENCE TO RELATED APPLICATION

This application claims benefit of priority to Korean Patent Application No. 10-2023-0072170 filed on Jun. 5, 2023 in the Korean Intellectual Property Office, the disclosure of which is incorporated herein by reference in its entirety.

TECHNICAL FIELD

Example embodiments of the present disclosure relate to a semiconductor measurement apparatus.

BACKGROUND

A semiconductor measurement apparatus may measure a dimension of a structure in a sample including a structure formed by a semiconductor process, and generally, the semiconductor measurement apparatus may measure a dimension using ellipsometry. Generally, ellipsometry may irradiate light to a sample at fixed azimuth and incidence angles and may determine a dimension of a structure included in a light-irradiated region in the sample using spectrum distribution of the light reflected from the sample. As a dimension of a structure formed by a semiconductor process gradually decreases, the effect of changes of another dimension on a spectrum distribution may increase. Accordingly, with the spectrum distribution obtained from ellipsometry, a dimension to be measured may not be accurately determined.

SUMMARY

Example embodiments provide a semiconductor measurement apparatus which may, by obtaining data for dimension judgment in all azimuth angles and a wide range of incident angles with one iteration, and obtaining pieces of polarization information from the original image without conversion to the frequency domain, accurately determine a selected dimension despite an interaction between different dimensions.

According to an example embodiment of the present disclosure, a semiconductor measurement apparatus includes a lighting unit including a light source and at least one lighting polarization element on a first travel path of light emitted by the light source; a light receiving unit including at least one light receiving polarization element on a second travel path of travel of light that passes through the at least one lighting polarization element and that is reflected from a sample, where the light receiving unit includes an image sensor configured to receive the light passing through the at least one light receiving polarization element and to output an original image; and a control unit configured to: generate a prediction equation representing the original image, where the prediction equation is based on a plurality of elements of a Mueller matrix, approximate each of the plurality of elements of the Mueller matrix to a polynomial including bases of a Zernike polynomial and coefficients, generate optimization coefficients based on a sum of the coefficients and a difference between the prediction equation and the original image, determine whether an optimization condition is satisfied based on the optimization coefficients and a minimum value, and determine a dimension based on the optimization coefficients and the bases when the optimization condition is satisfied.

According to an example embodiment of the present disclosure, a semiconductor measurement apparatus includes an image sensor configured to output a multiple-interference image representing interference patterns of polarization components of light reflected from a sample; an optical unit on a path in which the image sensor receives the light, the optical unit including an objective lens proximate to the sample; and a control unit configured to: generate a restored image approximating the multiple-interference image based on a polynomial that includes bases of a Zernike polynomial and a plurality of coefficients, determine optimization coefficients by optimizing the polynomial such that a difference between the restored image and the multiple-interference image is less than or equal to a predetermined reference difference and such that a number of coefficients having a 0 value among the plurality of coefficients is maximized, generate pieces of polarization information of light based on the optimization coefficients and the bases of the Zernike polynomial, and determine a dimension to be measured from a structure of the sample based on the pieces of polarization information.

According to an example embodiment of the present disclosure, a semiconductor measurement apparatus includes a lighting unit configured to irradiate beams of light in different wavelength bands to a sample including a structure thereon; an optical unit on a path in which the beams of light are reflected from the sample; an image sensor configured to generate a multiple-interference image representing interference patterns of a plurality of polarization components based on the beams of light; and a control unit configured to: generate elements of a Mueller matrix representing the plurality of polarization components by performing a compressive sensing routine on the multiple-interference image, determine a measurement parameter based on the elements of the Mueller matrix, the measurement parameter including at least one of an intensity difference, a phase difference, and a degree of polarization of the plurality of polarization components, and determine a dimension to be measured from the structure based on the measurement parameter.

BRIEF DESCRIPTION OF DRAWINGS

The above and other aspects, features, and advantages in the example embodiment will be more clearly understood from the following detailed description, taken in combination with the accompanying drawings, in which.

DETAILED DESCRIPTION

Figure 1:
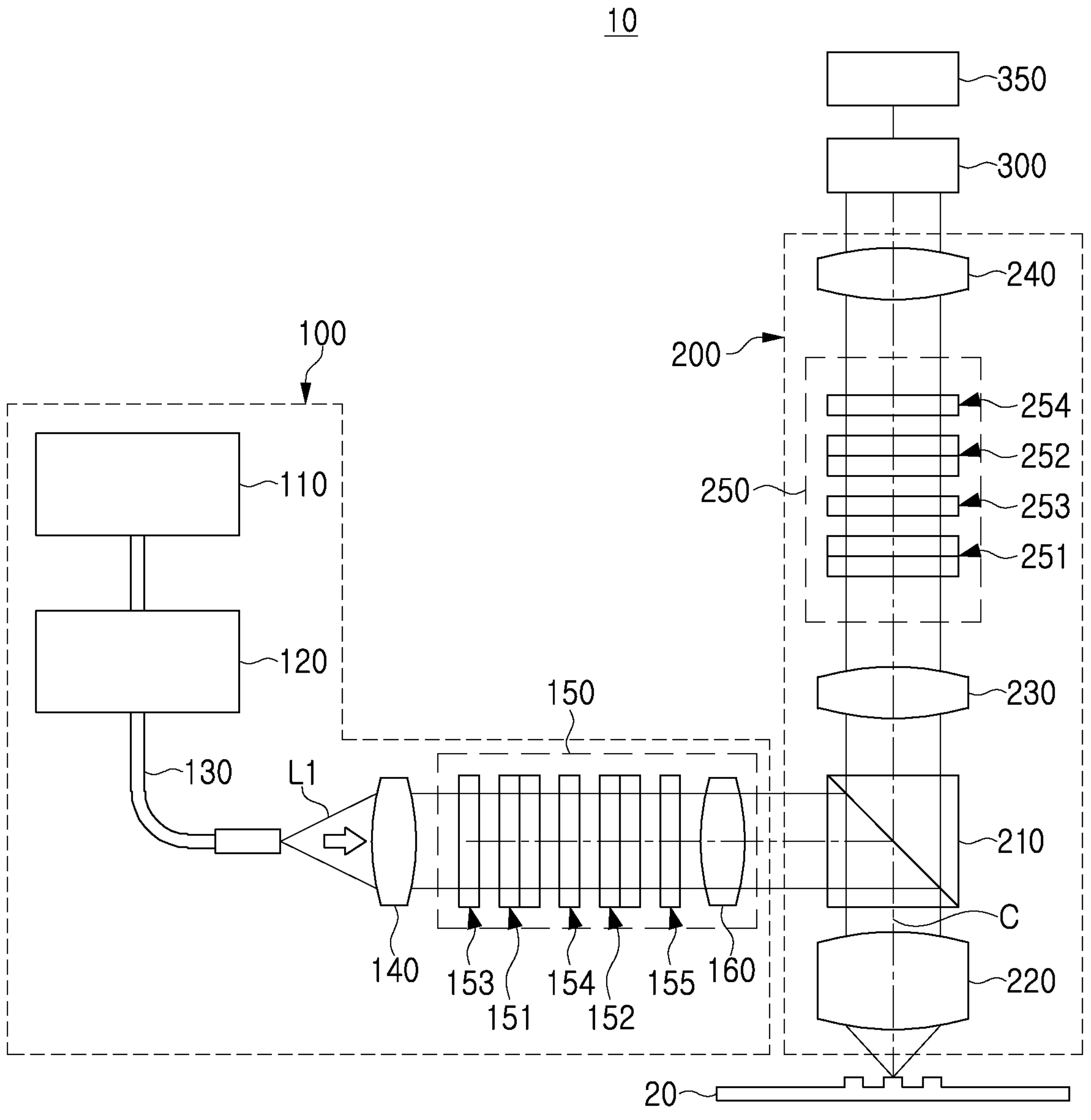
FIGS. 1, 2, 3, and 4 are diagrams illustrating a semiconductor measurement apparatus according to an example embodiment of the present disclosure.

To clarify the present disclosure, parts that are not connected with the description will be omitted, and the same elements or equivalents are referred to by the same reference numerals throughout the specification. Further, since sizes and thicknesses of constituent members shown in the accompanying drawings are arbitrarily given for better understanding and ease of description, the present disclosure is not limited to the illustrated sizes and thicknesses. In the drawings, the thickness of layers, films, panels, regions, etc., are exaggerated for clarity. In the drawings, for better understanding and ease of description, thicknesses of some layers and areas are excessively displayed.

It will be understood that when an element such as a layer, film, region, or substrate is referred to as being "on" another element, it can be directly on the other element or intervening elements may also be present. In contrast, when an element is referred to as being "directly on" another element, there are no intervening elements present. Further, spatially relative terms, such as "beneath," "below," "lower," "above," "upper," and the like, may be used herein for ease of description to describe one element's or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 90 degrees or at other orientations), and the spatially relative descriptors used herein may be interpreted accordingly.

In addition, unless explicitly described to the contrary, the word "comprises", and variations such as "comprises" or "comprising", will be understood to imply the inclusion of stated elements but not the exclusion of any other elements. As used herein, the phrase "at least one of A, B, and C" refers to a logical (A OR B OR C) using a non-exclusive logical OR, and should not be construed to mean "at least one of A, at least one of B and at least one of C." As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, steps, operations, elements and/or components, but do not preclude the presence or addition of one or more other features, steps, operations, elements, components and/or groups thereof. The term "and/or" includes any and all combinations of one or more of the associated listed items. The term "connected" may be used herein to refer to a physical and/or electrical connection and may refer to a direct or indirect physical and/or electrical connection.

The present disclosure has been described herein with reference to flowchart and/or block diagram illustrations of methods, systems, and devices in accordance with exemplary embodiments of the invention. It will be understood that each block of the flowchart and/or block diagram illustrations, and combinations of blocks in the flowchart and/or block diagram illustrations, may be implemented by computer program instructions and/or hardware operations. These computer program instructions may be provided to a processor of a general purpose computer, a special purpose computer, or other programmable data processing apparatus to produce a machine, such that the instructions, which execute via the processor of the computer or other programmable data processing apparatus, create means for implementing the functions specified in the flowchart and/or block diagram block or blocks.

These computer program instructions may also be stored in a non-transitory computer usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart and/or block diagram block or blocks.

Hereinafter, embodiments in the example embodiment will be described as follows with reference to the accompanying drawings.

FIGS. 1 to 4 are diagrams illustrating a semiconductor measurement apparatus according to an example embodiment.

Referring to FIG. 1, a semiconductor measurement apparatus 10 according to an example embodiment may be implemented as an apparatus using ellipsometry. As illustrated in FIG. 1, a semiconductor measurement apparatus 10 may include a lighting unit 100, an optical unit 200, an image sensor 300 and a control unit 350. In the semiconductor measurement apparatus 10, the lighting unit 100 may generate an image by receiving light irradiated to the sample 20 and reflected, and may measure a dimension of a structure included in the sample 20 by analyzing the image.

The lighting unit 100 may include a light source 110, a monochromator 120, a fiber 130, lighting lenses 140 and 160, and a lighting polarization unit 150. The light source 110 may output light incident to the sample 20, and light may include an ultraviolet wavelength band to an infrared wavelength band, or, in example embodiments, monochromatic light having a specific wavelength. The monochromator 120 may select and emit a predetermined wavelength band from light emitted by the light source 110. In the example embodiment, the monochromator 120 may radiate light to the sample 20 while changing a wavelength band of light emitted from the light source 110, and accordingly, light of a wide wavelength band may be radiated to the sample 20.

The fiber 130 may be a light guide member having a cable shape, and light incident to the fiber 130 may be irradiated to the first lighting lens 140. The first lighting lens 140 may be configured as a convex lens, and light may be incident to the lighting polarization unit 150 by adjusting an angular distribution of light irradiated by the fiber 130. For example, the first lighting lens 140 may convert light emitted by the fiber 130 into collimated light.

The lighting polarization unit 150 may polarize light passing through the lighting lens 140 in a predetermined polarization direction and may allow the light to be incident to the sample 20. In an example embodiment, the lighting polarization unit 150 may include at least one lighting polarization element and wave plates 154 and 155. For example, the lighting polarization unit 150 may include a first lighting polarization element 151, a second lighting polarization element 152, and a third lighting polarization element 153. Each of the first lighting polarization element 151 and the second lighting polarization element 152 may include a pair of beam displacers, and the third lighting polarization element 153 may be configured as a polarizer.

The wave plates 154 and 155 may be configured as half wave plates or ¼ wave plates (quarter wave plates), and in example embodiments, the number of lighting polarization elements 151-153 and the number of wave plates 154 and 155 may vary. For example, each of the first lighting polarization element 151 and the second lighting polarization element 152 may be implemented as at least one of a Nomarski prism, a Wallerston prism, and a Lotion prism. The third lighting polarization element 153 may polarize light with a polarization direction inclined by 45 degrees relative to the ground. Light passing through the lighting polarization unit 150 may be incident to the beam splitter 210 of the optical unit 200 through the second lighting lens 160, which may be implemented as a convex lens.

The beam splitter 210 of the optical unit 200 may reflect a portion of light received from the lighting unit 100 and may transmit a portion of the light. The light reflected from the beam splitter 210 may be incident to the objective lens 220, and the light passing through the objective lens 220 may be incident to the sample 20. As an example, light passing through the objective lens 220 may focus on a target region of the sample 20.

When light passing through the objective lens 220 is reflected on the target region of the sample 20, the objective lens 220 may receive reflected light again. In the example embodiment illustrated in FIG. 1, an optical axis C of light incident to and reflected from the sample 20 may be perpendicular to a surface of the sample 20.

Light irradiated to the sample 20 may include linearly polarized light in a specific direction. The linearly polarized light may be collected and incident to the target region of the sample 20, and the light may include a P polarization component and an S polarization component that is based on an incident angle that is further determined based on a surface of sample 20. For example, in light incident to the sample 20, the P polarization component may be reflected back to the P polarization component, and the S polarization component may be reflected back to the S polarization component.

The light reflected from the sample 20 may sequentially pass through the objective lens 220, the beam splitter 210, the first relay lens 230, the light receiving polarization unit 250, and the second relay lens 240 and may be incident to the image sensor 300. The first relay lens 230 may collect light passing through the beam splitter 210 and may form an image, and may allow the light to be incident to the light receiving polarization unit 250.

The light receiving polarization unit 250 may include at least one of light receiving polarization elements 251 and 252 and a wave plate 253 and an analyzer 254. The first light receiving polarization element 251 and the second light receiving polarization element 252 may polarize light passing through the first relay lens 230, and each may include a pair of beam displacers. The wave plate 253 may be a half wave plate similar to the wave plates 154 and 155 included in the lighting unit 100. Light passing through the light receiving polarization unit 250 may be incident to the image sensor 300 through the second relay lens 240.

Each of the first and second lighting polarization elements 151 and 152 and 251 and 252 may separate incident light into a first polarization component and a second polarization component. For example, the first lighting polarization element 151 may separate incident light into a first polarization component and a second polarization component, and may transmit light by moving an optical axis of each of the first polarization component and the second polarization component. The second lighting polarization element 152 may separate light polarized by 45 degrees by the half wave plate after passing through the first lighting polarization element 151 into a first polarization component and a second polarization component.

Accordingly, in the image sensor 300, a plurality of polarization components generated by the first and second lighting polarization elements 151 and 152 and 251 and 252 may be incident by interfering with each other, and accordingly, the image sensor 300 may generate a multiple-interference image as an original image. The image sensor 300 may output an original image to the control unit 350, and the control unit 350 may process the original image and may determine the dimension of the structure included in the region irradiated with light in sample 20.

In the example embodiment, the control unit 350 may determine a selected dimension among a plurality of dimensions of the structure included in sample 20 by processing the original image without an operation of converting the original image into a frequency domain. For example, the control unit 350 may configure a prediction equation representing the original image with a plurality of pieces of polarization information. Each of the plurality of pieces of polarization information included in the prediction equation may be defined as a polynomial comprising a plurality of bases and a plurality of coefficients, and the plurality of bases may be bases defined by a Zernike polynomial.

The control unit 350 may determine an optimization condition in which a calculation result obtained by adding a difference between the original image and the prediction equation and a sum of the plurality of coefficients included in the polynomial is minimized. When the optimization condition is derived, the control unit 350 may generate a prediction equation using the coefficients according to the optimization condition, and may determine polarization characteristics of light reflected from sample 20 and incident to the image sensor 300 using a plurality of pieces of polarization information of the prediction equation. For example, the control unit 350 may determine an intensity difference, a phase difference, and a degree of polarization of polarization components of light at various incident angles and azimuth angles based on the plurality of pieces of polarization information. The control unit 350 may determine the selected dimension to be measured among the dimensions of the structure included in sample 20 based on at least one of an intensity difference, a phase difference, and a degree of polarization of light polarization components.

Using the above method, the semiconductor measurement apparatus 10 may accurately measure the selected dimension to be measured among the dimensions of the structure of the sample 20. Generally, the dimension of the structure formed in sample 20 may be determined using the spectrum distribution according to a wavelength of light reflected from the sample 20. However, in this case, it may be difficult to accurately measure the selected dimension due to interactions in which other dimensions affect the spectrum distribution in addition to the selected dimension to be determined.

In the example embodiment, a selected dimension may be determined by optimizing a prediction equation comprising pieces of polarization information and representing an original image without a process of converting the original image into a frequency domain. Accordingly, due to the miniaturization of the structure included in sample 20, only the selected dimension may be accurately determined despite the interaction of dimensions affecting each other, and as such, the performance of the semiconductor measurement apparatus 10 and yield of the semiconductor process may improve.

Figure 2:
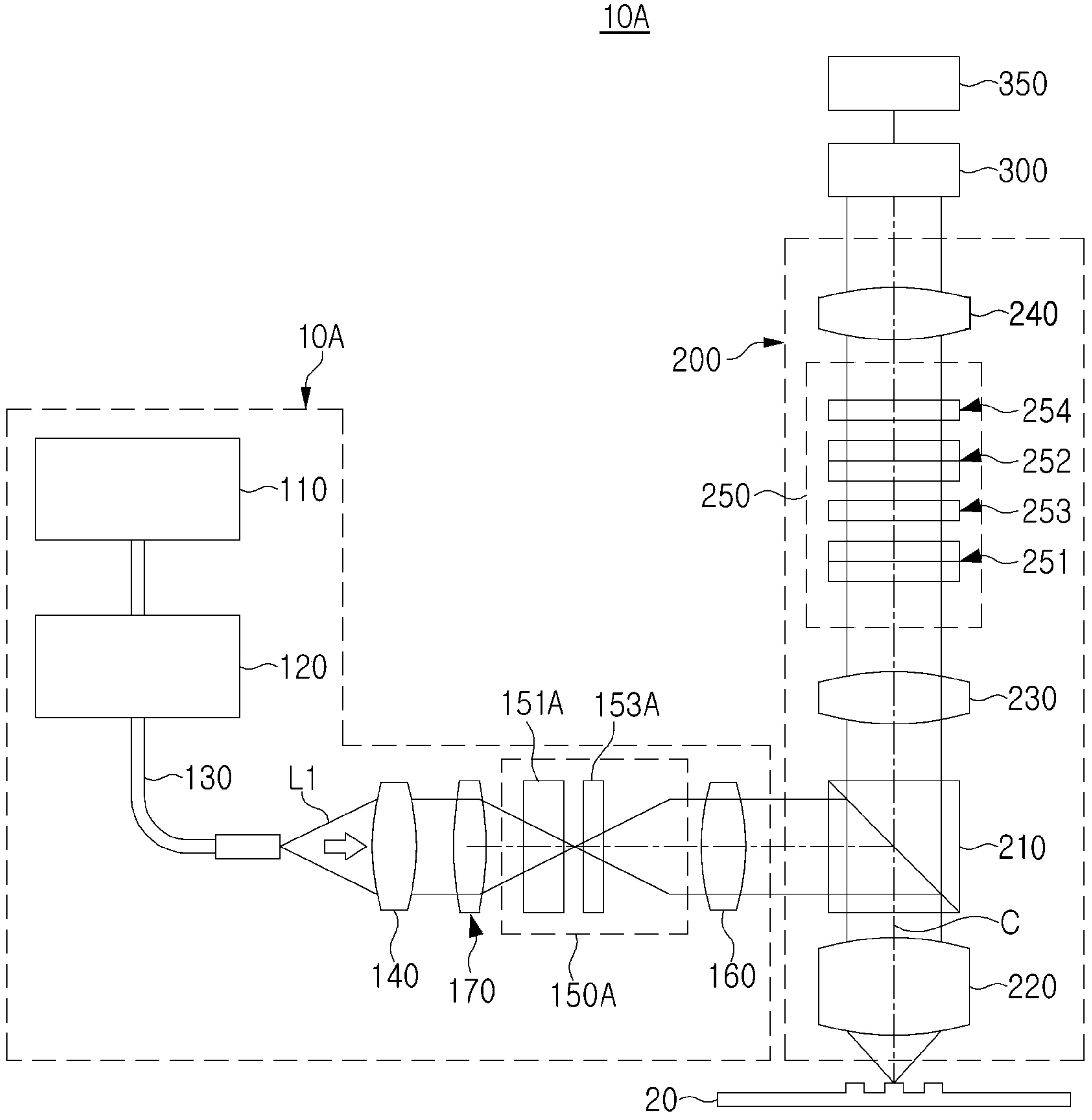

Thereafter, referring to FIG. 2, a semiconductor measurement apparatus 10A according to an example embodiment may include a lighting unit 100A, an optical unit 200, an image sensor 300 and a control unit 350. Operations of the light source 110, the monochromator 120, the fiber 130, the lighting lenses 140 and 160, the optical unit 200, the image sensor 300 and the control unit 350 may be similar to those in the example embodiment described with reference to FIG. 1.

However, in the lighting unit 100A, the lighting polarization unit 150A may have a structure different from the example embodiment described above with reference to FIG. 1. In the example embodiment illustrated in FIG. 2, the lighting polarization unit 150A may include a polarizer 151A and a wave plate 153A. For example, the wave plate 153A may be a ¼ wave plate. The control unit 350 may adjust a polarization state of light incident to the sample 20 by rotating a compensator comprising the polarizer 151A and the wave plate 153A. Light passing through the lighting polarization unit 150A may be incident to the beam splitter 210 of the optical unit 200 through the second lighting lens 160, which may be implemented as a convex lens.

Figure 3:
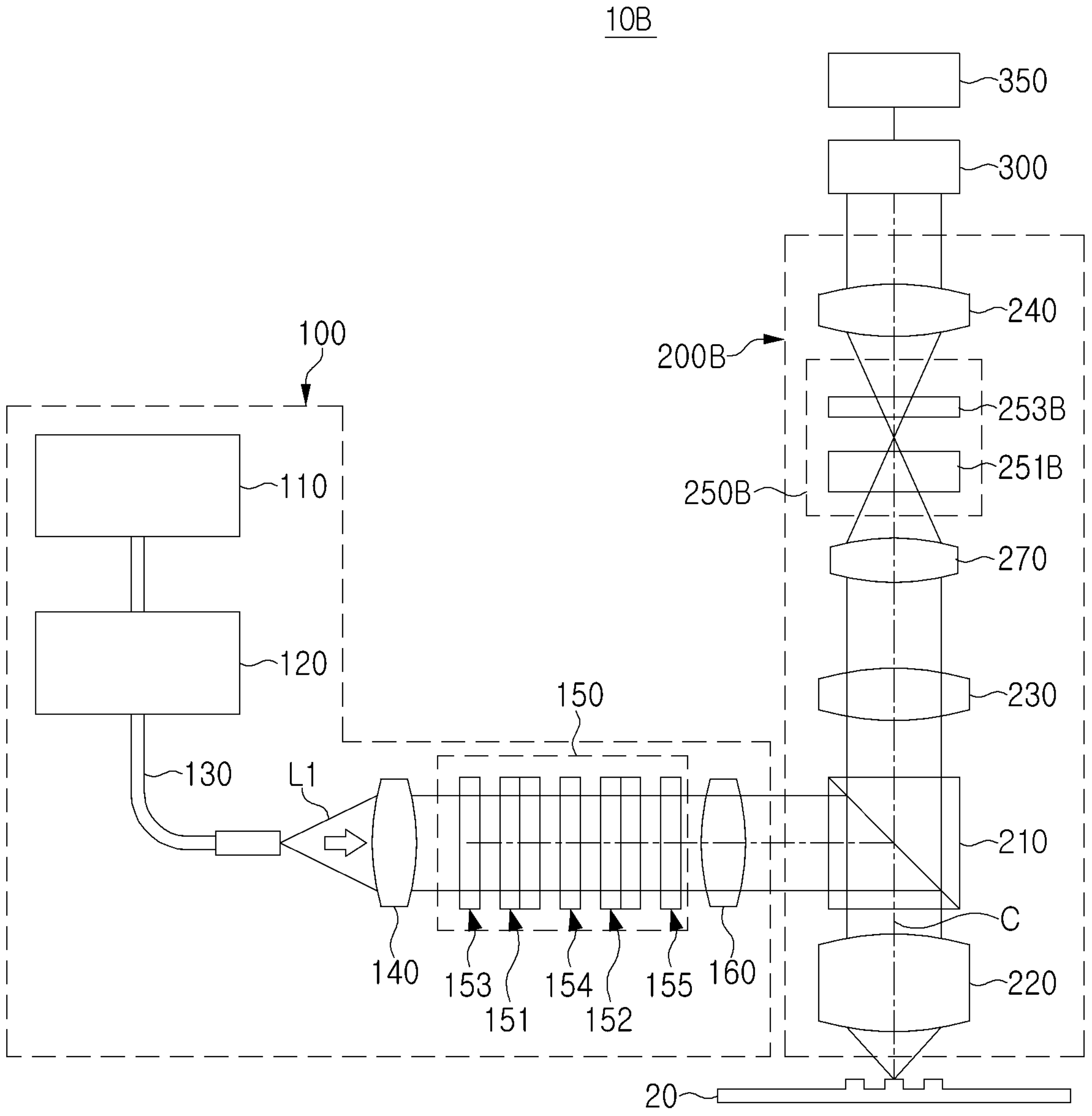

Thereafter, referring to FIG. 3, a semiconductor measurement apparatus 10B according to an example embodiment may include a lighting unit 100, an optical unit 200B, an image sensor 300 and a control unit 350. Operations of the beam splitter 210, the objective lens 220, the first relay lens 230, the second relay lens 240, the third relay lens 270, the lighting unit 100, the image sensor 300 and the control unit 350 may be similar to those in the example embodiment described with reference to FIG. 1.

However, the light receiving polarization unit 250B may have a structure different from the example embodiment described with reference to FIG. 1. The light receiving polarization unit 250B may include a compensator including a polarizer 251B and a wave plate 253B.

The wave plate 253B may be a ¼ wave plate, and the control unit 350 may adjust a polarization state of light incident to the image sensor 300 by rotating a compensator. For example, similar to the description with reference to FIG. 2, the control unit 350 may obtain an original image, which is a multiple-interference image, from the image sensor 300 while rotating the compensator at four different angles.

Figure 4:
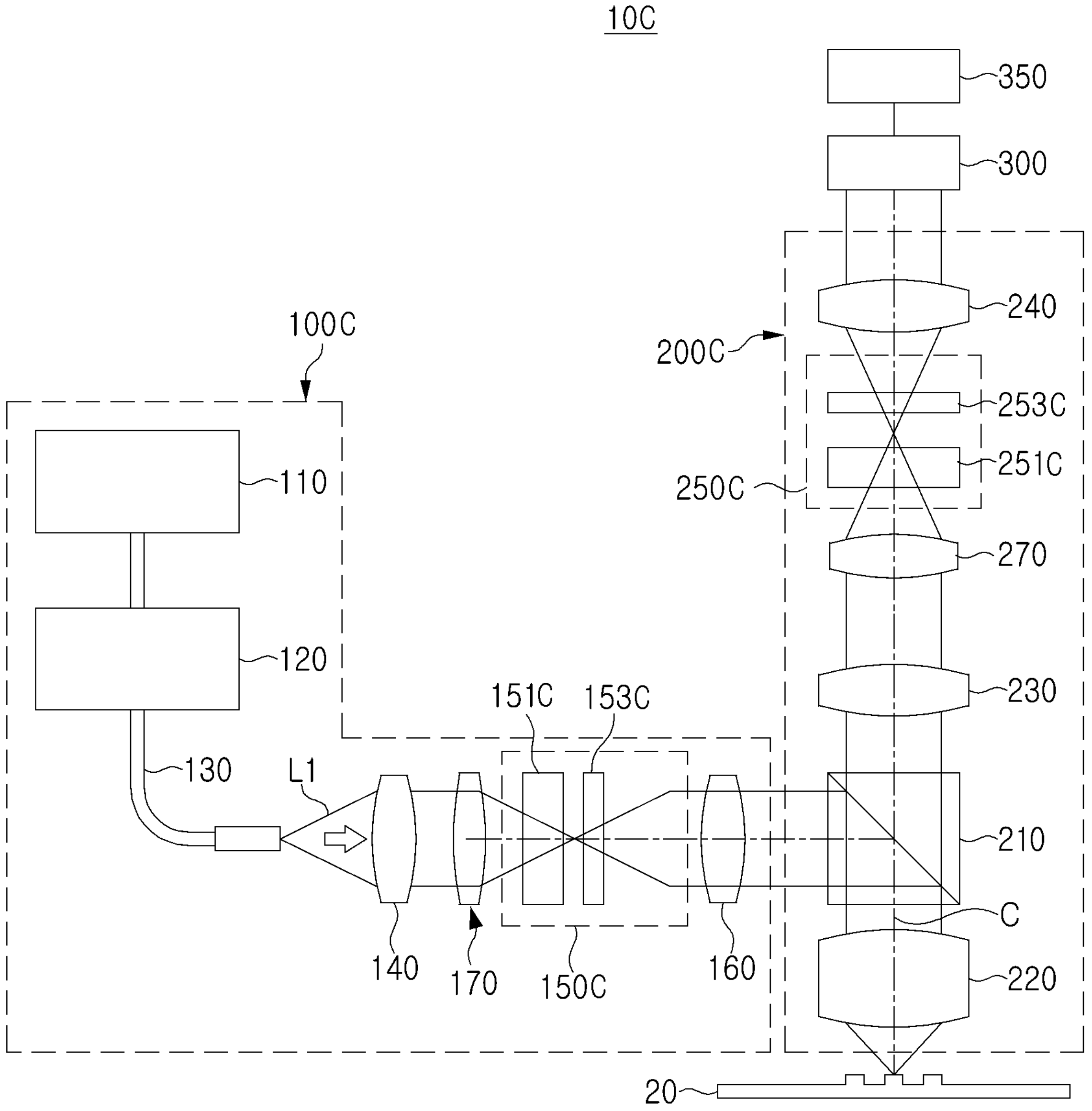

Referring to FIG. 4, a semiconductor measurement apparatus 10C according to an example embodiment may include a lighting unit 100C, an optical unit 200C, an image sensor 300 and a control unit 350. Operations of the image sensor 300 and the control unit 350 may be similar to those in the example embodiment described with reference to FIG. 1.

However, in the example embodiment illustrated in FIG. 4, the lighting polarization unit 150C of the lighting unit 100C may include a compensator including a polarizer 151C and a wave plate 153C, which are similar to the polarizer 151A and the wave plate 153A described with reference to FIG. 2. The light receiving polarization unit 250C of the optical unit 200C may also include a compensator including a polarizer 251C and a wave plate 253C.

In other words, in the example embodiment illustrated in FIG. 4, each of the lighting polarization unit 150C and the light receiving polarization unit 250C may include compensators instead of beam displacers. The control unit 350 may adjust the polarization state of light incident to the image sensor 300 by rotating the compensators included in the lighting polarization unit 150C and the light receiving polarization unit 250C, respectively, and the image sensor 300 may output a self-interference image generated by interference of polarization components of light to the control unit 350 as an original image.

Figure 5:
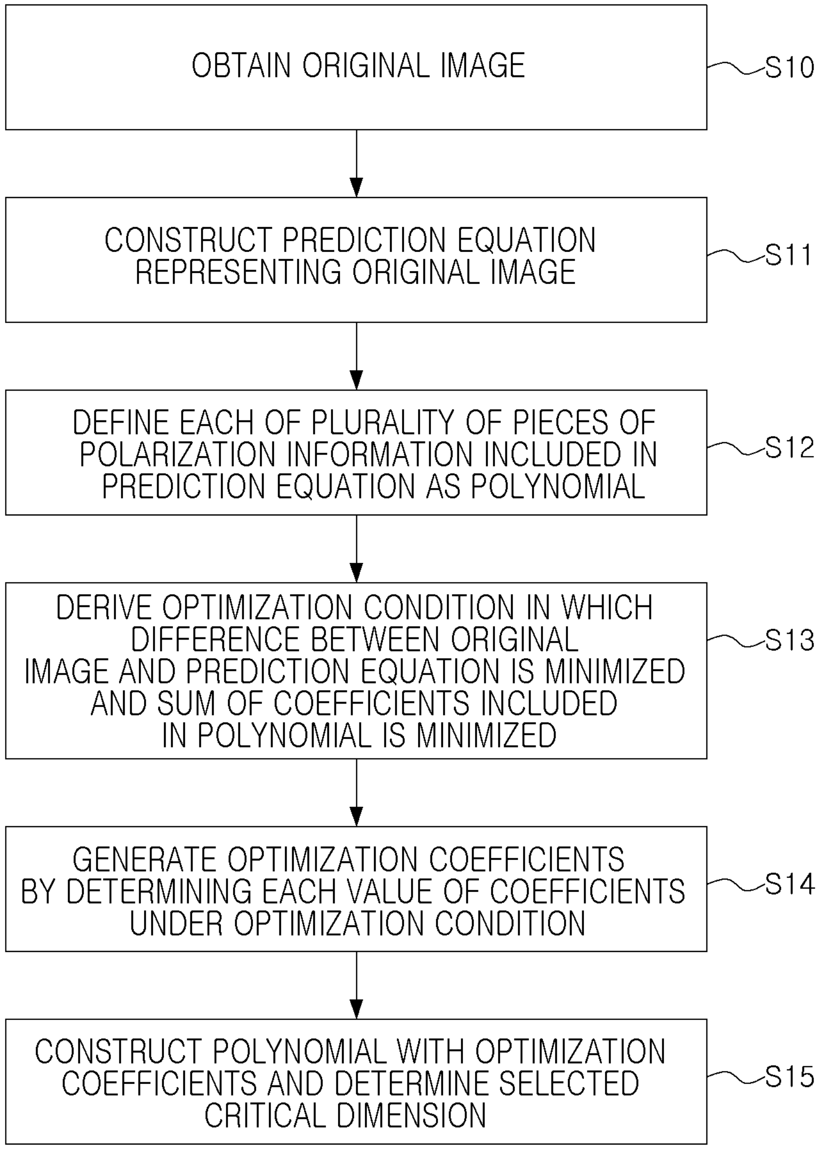
FIGS. 5 and 6 are diagrams illustrating a measurement method using a semiconductor measurement apparatus according to an example embodiment of the present disclosure.
Figure 6:
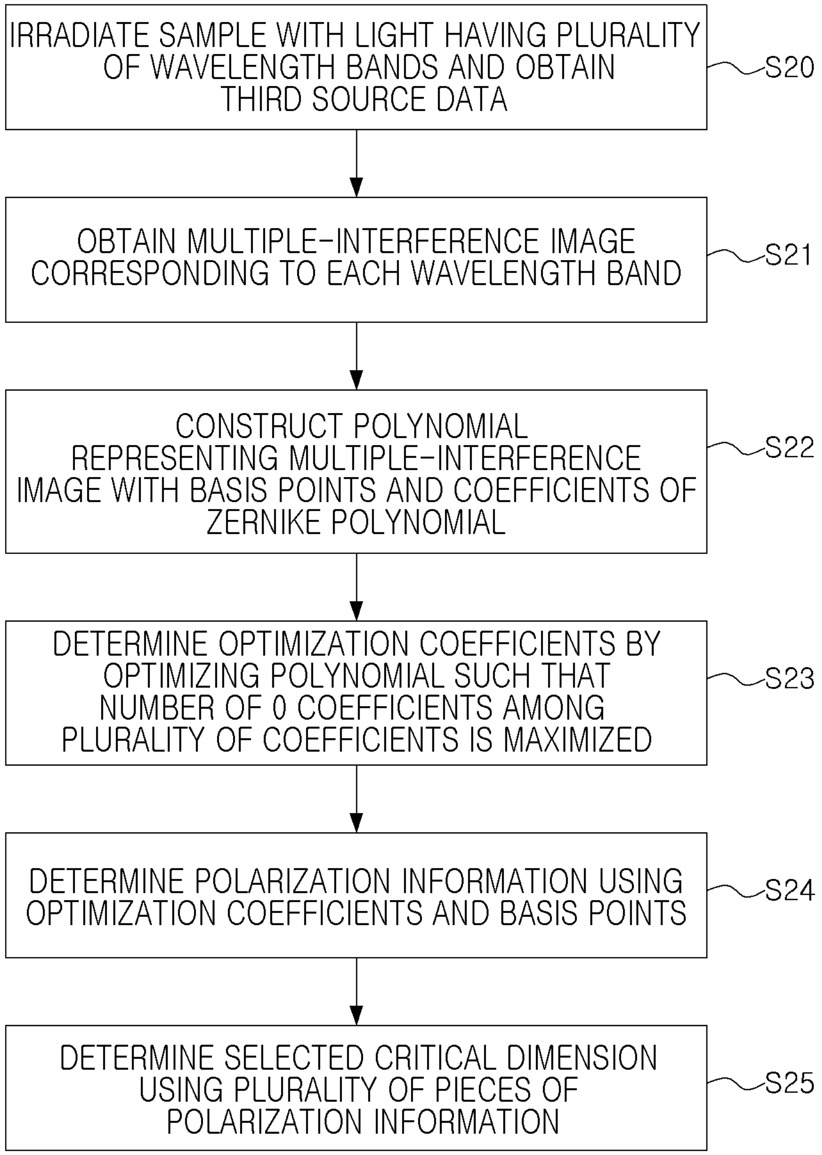

FIGS. 5 and 6 are diagrams illustrating a measurement method using a semiconductor measurement apparatus according to an example embodiment.

First, referring to FIG. 5, the measurement method according to the example embodiment may start with a control unit of a semiconductor measurement apparatus obtaining an original image (S10). The control unit may obtain an original image from the image sensor, and as described above with reference to FIGS. 1 to 4, polarization components of light generated by beam displacers and/or compensators may be incident to the image sensor. Accordingly, the original image may be a self-interference image created by polarization components of light interfering with each other.

The control unit may construct a prediction equation representing the original image (S11). The prediction equation may include a spatial frequency carrier and a plurality of pieces of polarization information, and the plurality of pieces of polarization information may be represented by a plurality of elements included in the Mueller matrix. A restored image similar to the original image may be constructed using the prediction equation. When the prediction equation is constructed, the control unit may define each of the plurality of pieces of polarization information included in the prediction equation as a polynomial (S12). A polynomial representing each of a plurality of pieces of polarization information may include a plurality of bases and a plurality of coefficients, and in the example embodiment, the plurality of bases may be bases according to a Zernike polynomial.

The control unit may derive an optimization condition in which the difference between the original image and the prediction equation is minimized and the sum of coefficients included in the polynomial is minimized (S13). When the difference between the original image and the prediction equation is minimized or relatively small, it may indicate that the restored image constructed using the prediction equation may be generated as an image similar to the original image. For example, the control unit may determine a condition in which a calculation result obtained by adding the sum of coefficients included in the polynomial to the difference between the original image and the prediction equation has a minimum value as the optimization condition. When the optimization condition is determined, the control unit may generate optimization coefficients by determining each value of the coefficients under the optimization condition (S14). The control unit may generate each of the plurality of pieces of polarization information by constructing a polynomial with the optimization coefficients and the plurality of bases, and may determine a selected dimension based on the information (S15).

In the example embodiment, polarization characteristics of light reflected from a sample and incident to an image sensor may be analyzed by a compression sensing method included in a prediction equation approximating an original image without a process of converting the original image into a frequency domain. Accordingly, the polarization characteristics of the light represented by the original image may be analyzed without band pass filtering applied in the process of converting the original image into the frequency domain and inversely transforming the image. By using such a compression sensing method, the polarization characteristics of light may be restored in a high frequency band, and accordingly, the selected dimension may be accurately determined.

When converting the original image, which is a multiple-interference image, into the frequency domain, inverting the image, and analyzing the polarization characteristics of light, it may be necessary to obtain a reference image by irradiating light to a reference sample with the same semiconductor measurement apparatus. The reference sample may be a bare wafer. A reference value in the frequency domain may be obtained by converting the reference image, obtained by irradiating the bare wafer with light, to the frequency domain. When a multiple-interference image is obtained from a sample to be measured, a normalization operation of converting the image to the frequency domain and applying a reference value may need to be performed, whereas in the example embodiment, the multiple-interference image may be analyzed using the compression sensing method without conversion to the frequency domain and while determining the polarization characteristics of light, such that the measurement process for the reference sample may not be performed.

Thereafter, referring to FIG. 6, the measurement method according to the example embodiment may start by irradiating a sample with light having a plurality of wavelength bands and obtaining third source data (S20). For example, the control unit of the semiconductor measurement apparatus may control the monochromator of the lighting unit and may adjust the wavelength band of the light irradiated to the sample, and while light of each wavelength band is irradiated to the sample, a multiple-interference image generated by the interference of polarization components of light may be obtained. Accordingly, since a multiple-interference image is generated in a plurality of wavelength bands, the control unit may obtain third source data in which the multiple-interference image is arranged according to the wavelength bands.

The control unit of the semiconductor measurement apparatus may obtain a multiple-interference image corresponding to each wavelength band as an original image (S21). The control unit may construct a polynomial representing a multiple-interference image with bases of the Zernike polynomial and coefficients (S22). As an example, the multiple-interference image may be represented as a prediction equation comprising a spatial frequency carrier and a plurality of pieces of polarization information, and each of the plurality of pieces of polarization information may be defined as a polynomial comprising bases of a Zernike polynomial and coefficients. By the prediction equation, a restored image similar to a multiple-interference image may be created.

The control unit may optimize the polynomial such that the number of coefficients having a value of 0 among the plurality of coefficients is maximized. A condition in which the number of coefficients having a value of 0 is maximized may be defined as an optimization condition, and the control unit may determine optimization coefficients, which is a value of each coefficient in the optimization condition (S23). The control unit may represent each of a plurality of pieces of polarization information with the optimization coefficients and the bases of the Zernike polynomial determined in operation S23 (S24), and may determine the selected dimension using a plurality of pieces of polarization information (S25).

For example, the control unit may select a condition in which the number of coefficients having a value of 0 is maximized among the plurality of coefficients and simultaneously, the restored image generated by the prediction equation may represent the multiple-interference image properly as an optimization condition. The control unit may select coefficients to generate a restored image representing the multiple-interference image properly, and in this case, two or more estimation equations may be generated by the selected coefficients. The control unit may determine optimization coefficients by selecting a prediction equation having a maximum number of coefficients having a value of 0 from among two or more estimation equations.

For example, the control unit may tune the prediction equation such that the difference between the restored image and the multiple-interference image is less than or equal to a reference difference. When multiple estimation equations that generate a multiple-interference image and a restored image equal to or less than a standard difference, the control unit may determine that, among the plurality of estimation equations, the prediction equation with the maximum number of coefficients having a value of 0 may satisfy the optimization condition.

Figure 7:
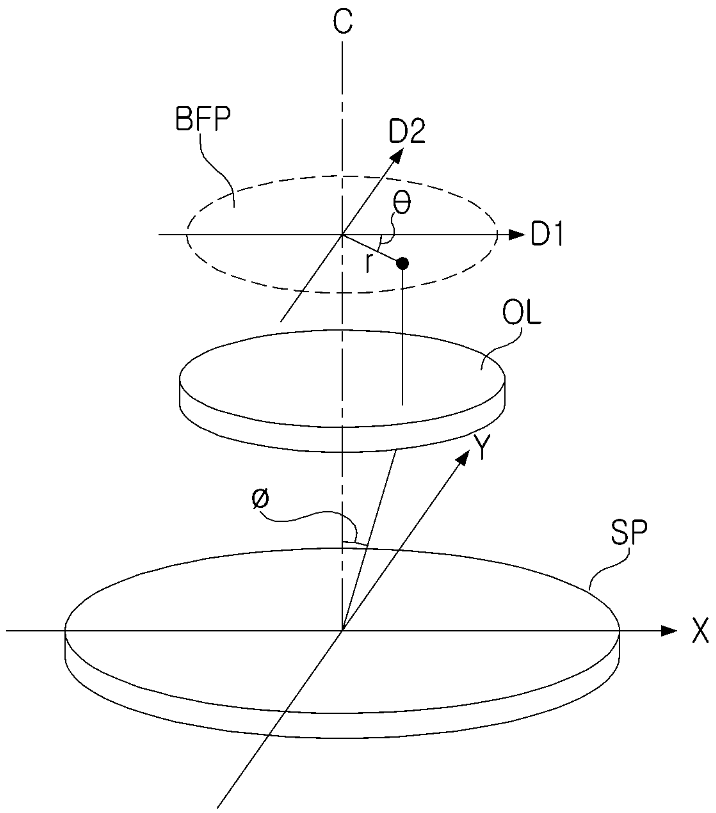
FIG. 7 is a diagram illustrating a method of operating a semiconductor measurement apparatus according to an example embodiment of the present disclosure.

FIG. 7 is a diagram illustrating a method of operating a semiconductor measurement apparatus according to an example embodiment.

Referring to FIG. 7, light may be irradiated to the surface of the sample SP, and the surface of the sample SP may be defined as an X-Y plane. The optical axis C may extend from an origin of the X-Y plane and may extend in a direction perpendicular to the X-Y plane, and a center of the objective lens OL adjacent to the sample SP may correspond to the optical axis C. The objective lens OL may include a front surface opposing the sample SP and a rear surface disposed on the opposite side of the sample SP, and a back focal plane BFP may be defined at a predetermined distance from a rear surface of the objective lens OL.

The back focal plane BFP may be a plane defined by the first direction D1 and the second direction D2. For example, the first direction D1 may be the same as the X direction of the sample SP surface, and the second direction D2 may be the same as the Y direction. Light passing through the objective lens OL may be collected in the form of a point on the target region of the sample SP, may be reflected from the target region, may pass through the objective lens OL and may travel to the back focal plane BFP. As described above, in the semiconductor measurement apparatus according to the example embodiment, light may be incident to the sample SP at an entire azimuth angle including 0 to 360 degrees, and the range of the incident angle (q) of the light incident to the sample SP may be determined according to a numerical aperture of the objective lens OL.

In an example embodiment, the objective lens OL having a numerical aperture of 0.8 or more and less than 1.0 may be employed in the semiconductor measurement apparatus such that data for a wide range of incident angle may be obtained by one-time imaging performed by the image sensor. As an example, the maximum incident angle of light passing through the objective lens OL may be greater than or equal to 72 degrees and less than 90 degrees. For example, the image sensor may be disposed such that the light receiving surface may be disposed in a conjugate position to the position of the back focal plane of the objective lens.

When each coordinate included in the back focal plane BFP defined by the first direction D1 and the second direction D2 is represented as polar coordinates (r, θ), as illustrated in FIG. 7, the first coordinate (r) may be determined by the incident angle (φ). Since the second coordinate (θ) is a value indicating how much the coordinate rotate with respect to the first direction D1, the value may be the same as the azimuth angle of light incident to the sample SP, and may have a value of 0 degrees to 360 degrees.

Accordingly, in the semiconductor measurement apparatus according to the example embodiment, data including interference patterns in the range of an azimuth angle from 0 degrees to 360 degrees and an incident angle determined by the numerical aperture of the objective lens OL may be obtained in the form of an image by one-time imaging performed while light is reflected from the target region of the sample SP. Accordingly, differently from a lighting unit irradiating light to the sample SP or a general method requiring imaging performed multiple times while changing the position and angle of the sample, the data required to analyze and measure the target region of the sample SP may be obtained by one-time imaging, and the efficiency of the measurement process using a semiconductor measurement apparatus may be improved.

FIGS. 8 to 13 are diagrams illustrating a method of operating a semiconductor measurement apparatus according to an example embodiment.

FIGS. 8 to 13 may be diagrams illustrating a process in which polarization components of light are separated by a polarization element included in a semiconductor measurement apparatus. For example, as described above with reference to FIGS. 1 to 4, polarization components of light may be separated by a beam displacer and/or a compensator included in the semiconductor measurement apparatus. In example embodiments described with reference to FIGS. 8 to 13, the X-Y plane 400 may be a plane perpendicular to an optical axis of light emitted from a lighting unit of a semiconductor measurement apparatus or light reflected from a sample. Hereinafter, for ease of description, lighting polarization elements included in a lighting unit of a semiconductor measurement apparatus will be described.

Figure 8:
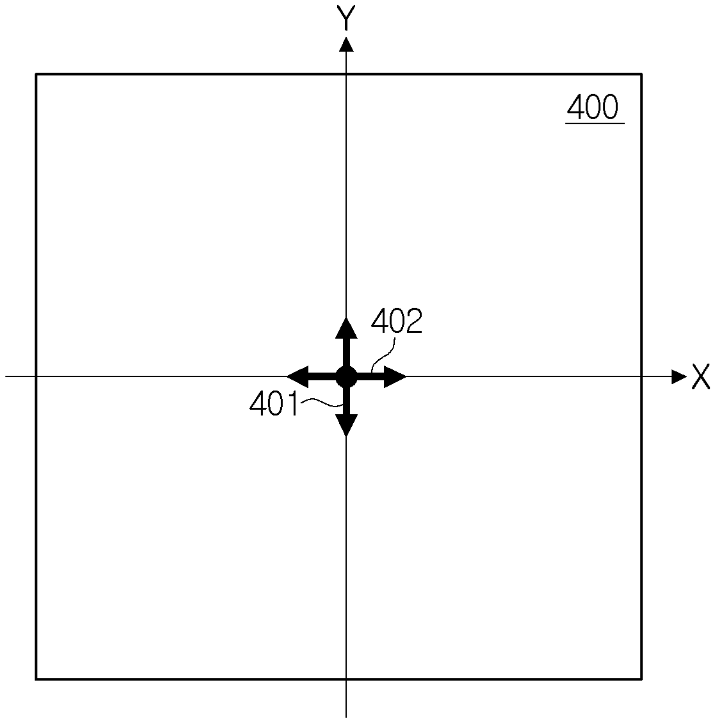
FIGS. 8, 9, 10, 11, 12 and 13 are diagrams illustrating a method of operating a semiconductor measurement apparatus according to an example embodiment of the present disclosure.

First, referring to FIG. 8, the optical axis of light emitted from the lighting unit may be disposed at the origin of the X-Y plane 400. Light incident to the X-Y plane 400 may include a first polarization component 401 and a second polarization component 402, and characteristics of light may be determined by intensity and a phase of each of the first polarization component 401 and the second polarization component 402. The lighting unit may include a first lighting polarization element and a second lighting polarization element, and each of the first lighting polarization element and the second lighting polarization element may include a pair of beam displacers. One of the pair of beam displacers may separate and move only the first polarization component 401, and the other of the pair of beam displacers may separate and move only the second polarization component 402.

Figure 9:
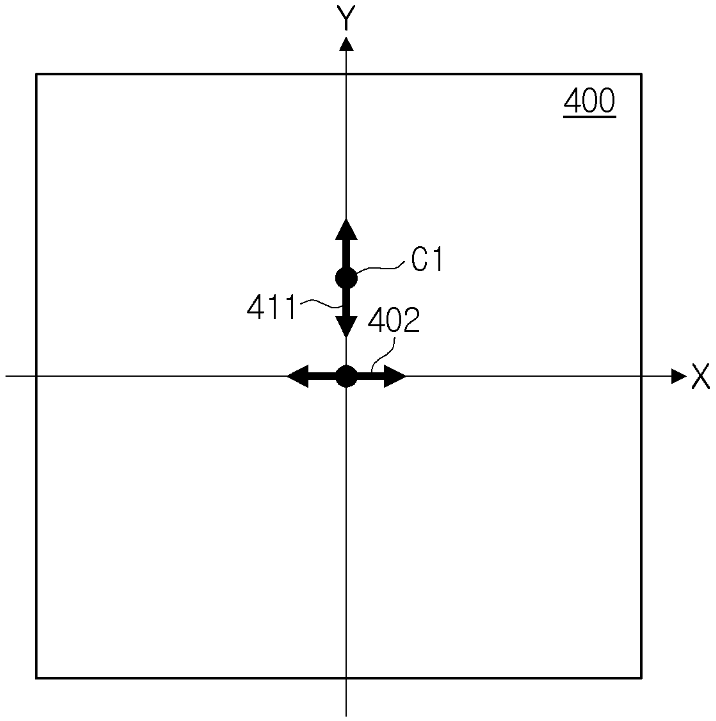

FIG. 9 is a diagram illustrating polarization components of light passing through a first beam displacer among a pair of beam displacers included in a first lighting polarization element. Referring to FIGS. 8 and 9, the first beam displacer may separate and move only the first polarization component 401. Accordingly, as illustrated in FIG. 9, in the light passing through the first beam displacer of the first lighting polarization element, the first polarization component 411 may be disposed at the first coordinate C1, rather than the origin of the X-Y plane 400. The second polarization component 402 may still be disposed at the origin of the X-Y plane 400.

Figure 10:
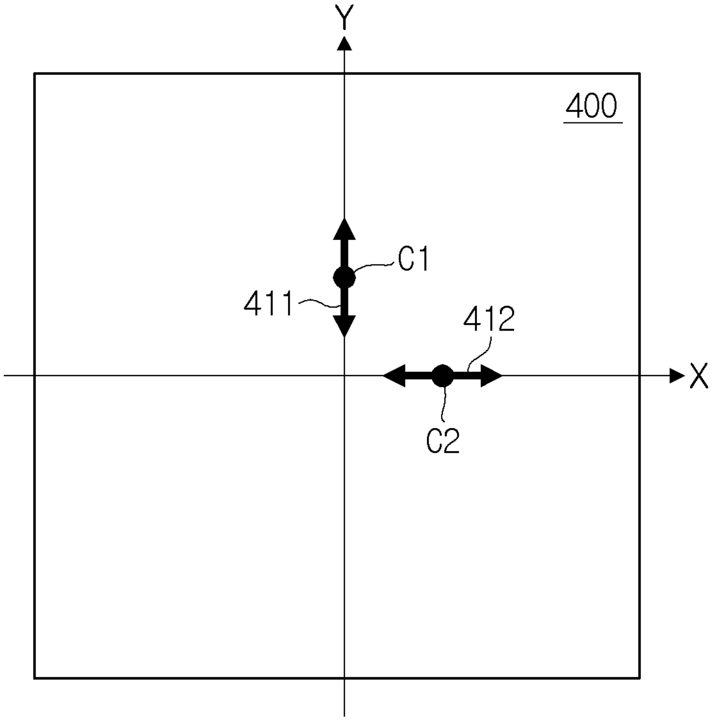

FIG. 10 is a diagram illustrating polarization components of light passing through a second beam displacer among a pair of beam displacers included in a first lighting polarization element. The second beam displacer of the first lighting polarization element may separate and move only the second polarization component 402 from the light emitted by the lighting unit. Accordingly, as illustrated in FIG. 10, in the light passing through the second beam displacer of the first lighting polarization element, the second polarization component 412 may be disposed at the second coordinate C2, not the origin of the X-Y plane 400.

Figure 11:
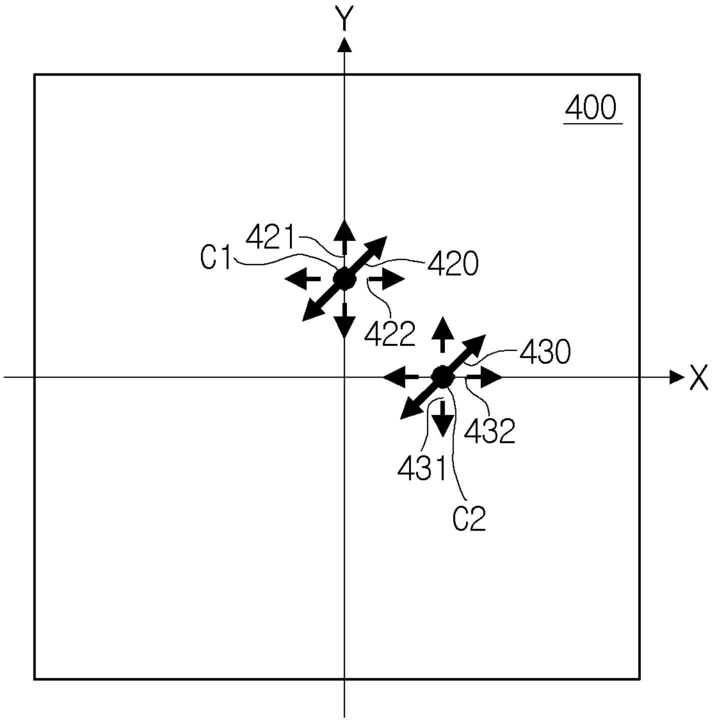
Figure 12:
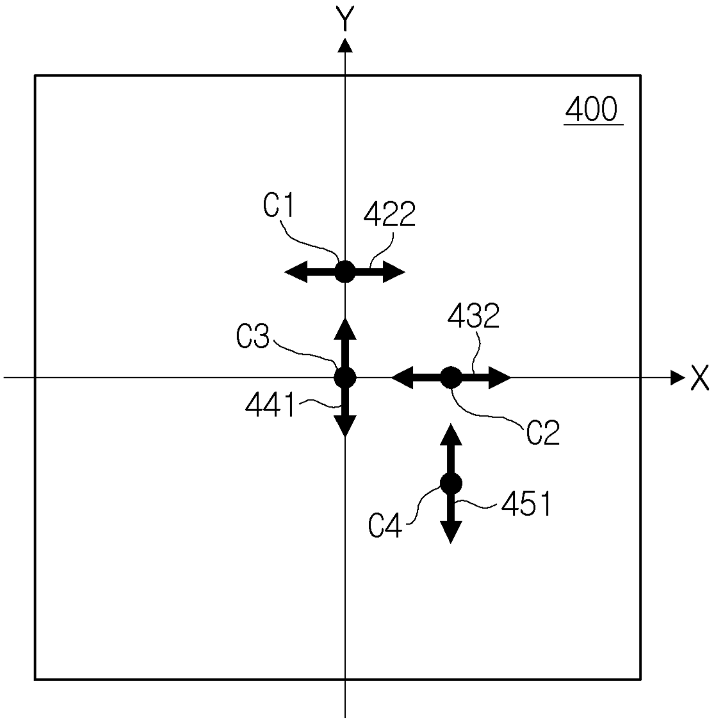

FIG. 11 is a diagram illustrating light after passing through a wave plate included in a lighting unit. Referring to FIG. 12, the polarization direction of light in the wave plate may be adjusted. For example, a first polarization component 411 separated by a first lighting polarization element, a second polarization component 412, a first beam of light 420 having an optical axis passing through first coordinate C1 with each polarization direction distorted by 45 degrees, and a second beam of light 430 having an optical axis passing through second coordinate C2 may be generated.

Light incident to the X-Y plane 400 may be decomposed into polarization components travelling in directions orthogonal to each other. In other words, light may be decomposed into a polarization component traveling in the X-axis direction and a polarization component traveling in the Y-axis direction. Referring to FIG. 11, a first beam of light 420 may be decomposed into a first polarization component 421 traveling in the Y-axis direction and a second polarization component 422 traveling in the X-axis direction. Similarly, the second beam of light 430 may also be decomposed into a first polarization component 431 and a second polarization component 432.

Light passing through the wave plate may be incident to a second lighting polarization element. FIG. 12 is a diagram illustrating polarization components of light passing through a first beam displacer among a pair of beam displacers included in a second lighting polarization element. Referring to FIG. 12, the first beam displacer of the second polarization element may selectively separate and move only the first polarization components 421 and 431 from the first beam of light 420 and the second beam of light 430, respectively. Accordingly, as illustrated in FIG. 12, a first polarization component 441 passing through the third coordinate C3, which is the origin, and a first polarization component 451 passing through the fourth coordinate C4 may be generated. Positions of the second polarization components 422 and 432 of the first beam of light 420 and the second beam of light 430 may not be adjusted.

Figure 13:
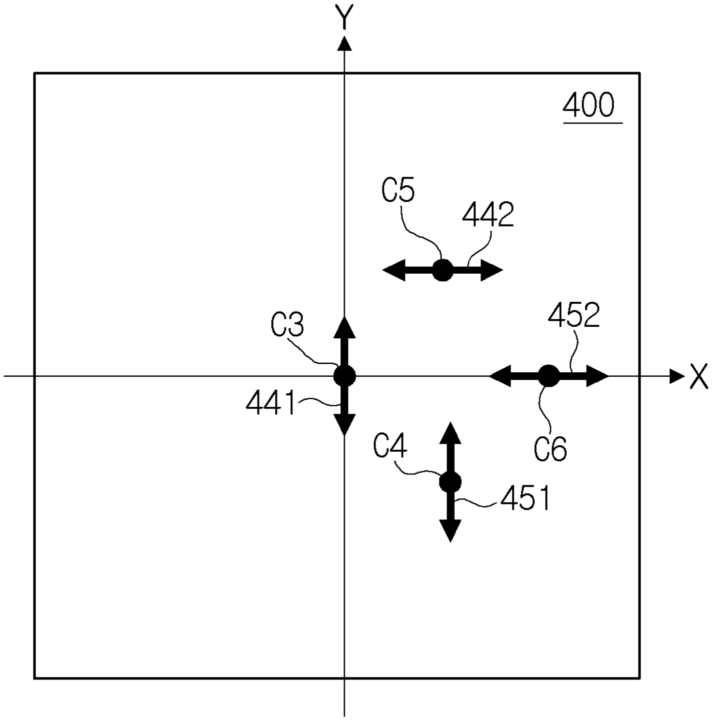

Thereafter, FIG. 13 may be a diagram illustrating polarization components of light passing through the second beam displacer among a pair of beam displacers included in the second lighting polarization element. Differently from the first beam displacer, the second beam displacer may adjust only the positions of the second polarization components 422 and 432. For example, as illustrated in FIG. 13, the position of the first polarization component 442 of the first beam of light 420 may be changed to the fifth coordinate C5, and the position of the second polarization component 452 of the second beam of light 430 may be changed to the sixth coordinate C6. Accordingly, as illustrated in FIG. 13, the light emitted from the light source in the lighting unit may be separated into the polarization components 441, 442, 451, and 452 corresponding to four paths and incident to the sample.

However, as described with reference to FIGS. 2 to 4, at least one of the lighting unit and the light receiving unit may include a compensator instead of a polarization element. The compensator may change the polarization state of light according to a rotation angle thereof. The control unit of the semiconductor measurement apparatus may rotate the compensator at least four different angles, and the polarization state of each of the polarization components 441, 442, 451, and 452 reflected from the sample may vary depending on the rotation angle of the compensator. The operation of the compensator will be described later with reference to FIGS. 14A-14B, 15A-15B, 16A-16B, and 17A-17B.

The image sensor of the semiconductor measurement apparatus may output a self-interference image representing the interference of polarization components of light as an original image, and the control unit may determine the polarization characteristics of light by applying the compression sensing method to the obtained original image. For example, the control unit may determine an intensity difference, a phase difference, and a degree of polarization of the polarization components of the light incident to the image sensor. The control unit may measure the selected dimension and overlay of structures formed in the region in which light is reflected from the sample using at least one of an intensity difference, a phase difference, and a degree of polarization of polarization components of light.

FIGS. 14A-14B, 15A-15B, 16A-16B, and 17A-17B are diagrams illustrating a polarization element included in a semiconductor measurement apparatus according to an example embodiment. In the example embodiment described with reference to FIGS. 14A-14B, 15A-15B, 16A-16B, and 17A-17B, it is assumed that the optical axis of light is parallel to the z-axis.

Figure 14A:
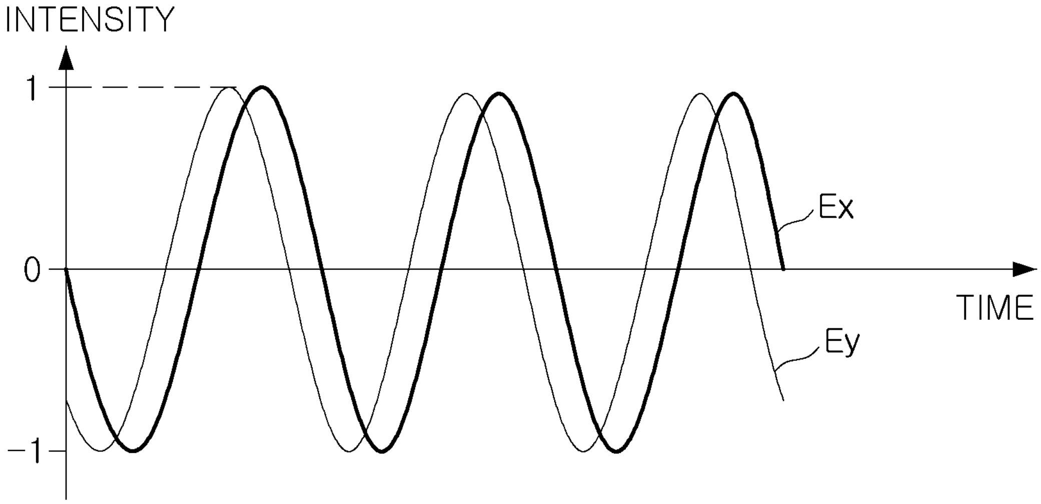
FIGS. 14A, 14B, 15A, 15B, 16A, 16B, 17A, and 17B are diagrams illustrating a polarization element included in a semiconductor measurement apparatus according to an example embodiment of the present disclosure.
Figure 14B:
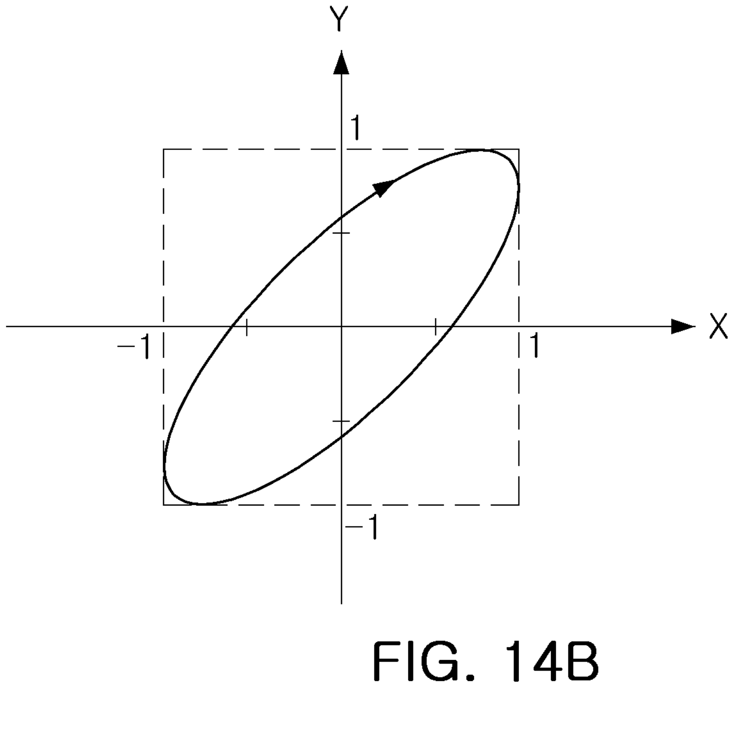

First, FIGS. 14A-14B are graphs illustrating the polarization state of light passing through the compensator when the rotation angle of the compensator is a first angle. FIG. 14A may represent a first polarization component Ex in the X-axis direction and a second polarization component Ey in the Y-axis direction included in light passing through the compensator. One of the first polarization component Ex and the second polarization component Ey may be a P polarization component, and the other may be an S polarization component. The first polarization component Ex and the second polarization component Ey may have a predetermined first phase difference, and the polarization state of light in the X-Y plane due to the first phase difference may have an elliptical shape as illustrated in FIG. 14B. As illustrated in FIG. 14A, the first phase difference may be $-\pi/4$.

Figure 15A:
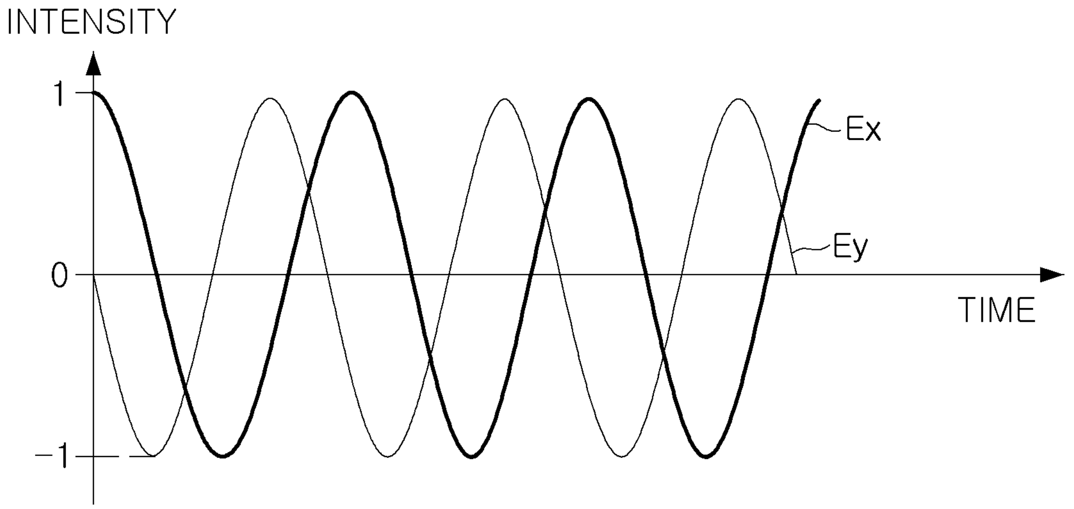
Figure 15B:
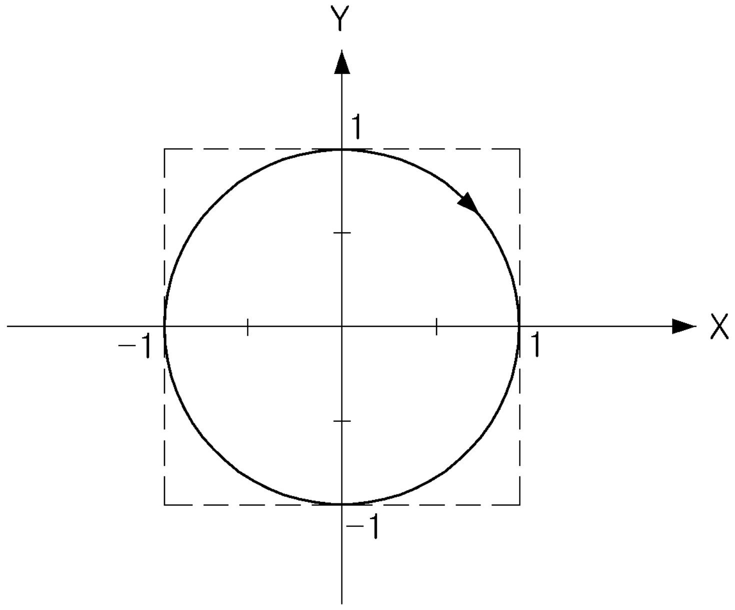

FIGS. 15A-15B are graphs illustrating a polarization state of light passing through a compensator when a rotation angle of the compensator is a second angle different from the first angle. As illustrated in graph FIG. 15A, as the rotation angle of the compensator is adjusted to the second angle, the phase difference between the first polarization component Ex and the second polarization component Ey may be a second phase difference different from the first phase difference. For example, in the example embodiment illustrated in FIG. 15A, the second phase difference may be $-\pi/2$. Also, when the rotation angle of the compensator is the second angle, the polarization state of light passing through the compensator may have a circular shape rotating clockwise.

Figure 16A:
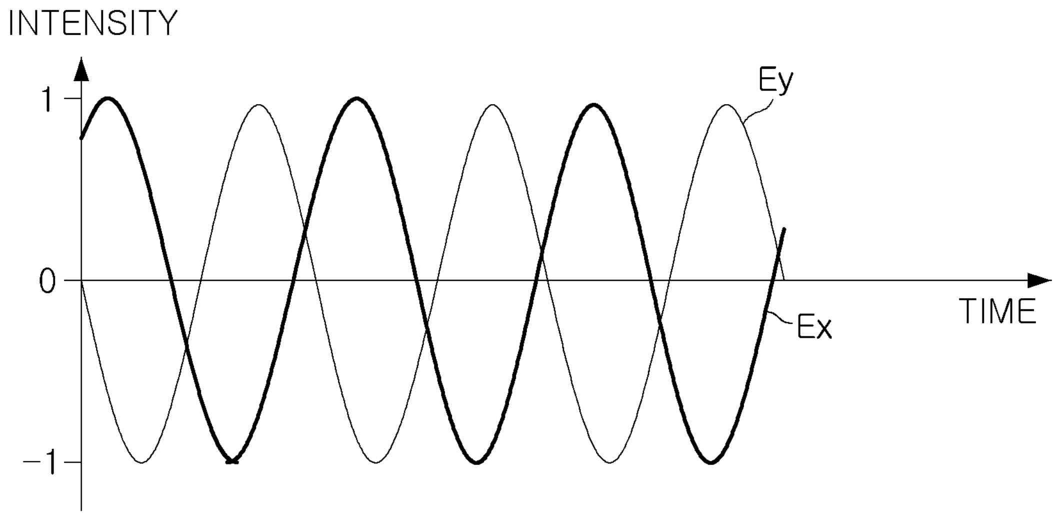
Figure 16B:
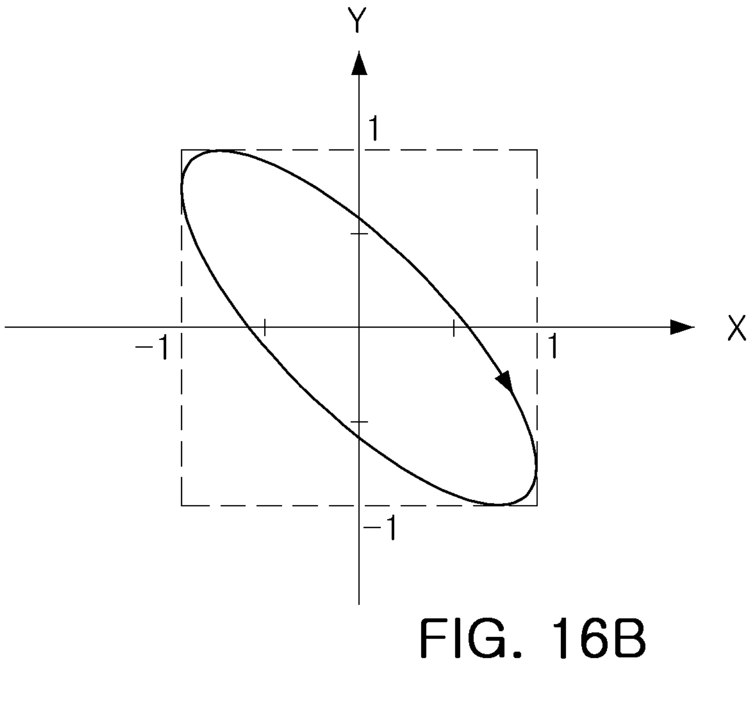

FIGS. 16A-16B are graphs illustrating the polarization state of light passing through the compensator when the rotation angle of the compensator is a third angle different from the first and second angles. Referring to FIG. 16A, when the rotation angle of the compensator is the third angle, the phase difference between the first polarization component Ex and the second polarization component Ey may be the third phase difference, and the third phase difference may be $-3\pi/4$. Also, the polarization state of light passing through the compensator may have an elliptical shape in the X-Y plane, as illustrated in FIG. 16B.

Figure 17A:
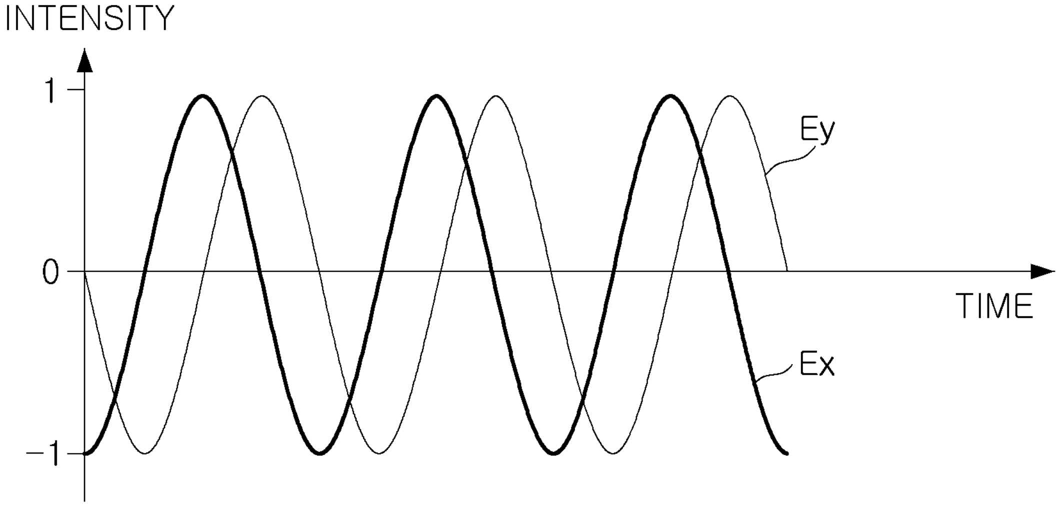
Figure 17B:
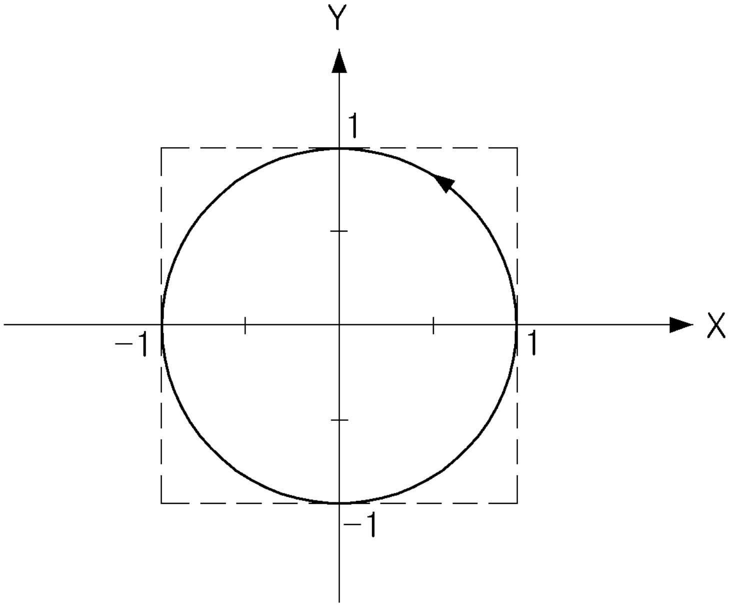

FIGS. 17A-17B illustrate a polarization state of light passing through the compensator when the rotation angle of the compensator is a fourth angle different from the first to third angles. As illustrated in FIG. 17A, when the rotation angle of the compensator is adjusted to the fourth angle, the fourth phase difference between the first polarization component Ex and the second polarization component Ey may be $\pi/2$. Also, as illustrated in FIG. 17B, the polarization state of light passing through the compensator may have a circular shape rotating counterclockwise.

As described with reference to FIGS. 14A-14B, 15A-15B, 16A-16B, and 17A-17B, the polarization state of light passing through the compensator may vary according to the rotation angle of the compensator. The control unit may adjust the rotation angle of the compensator to at least four different angles, and for each rotation angle, a plurality of original images output by the image sensor may be obtained.

Figure 18:
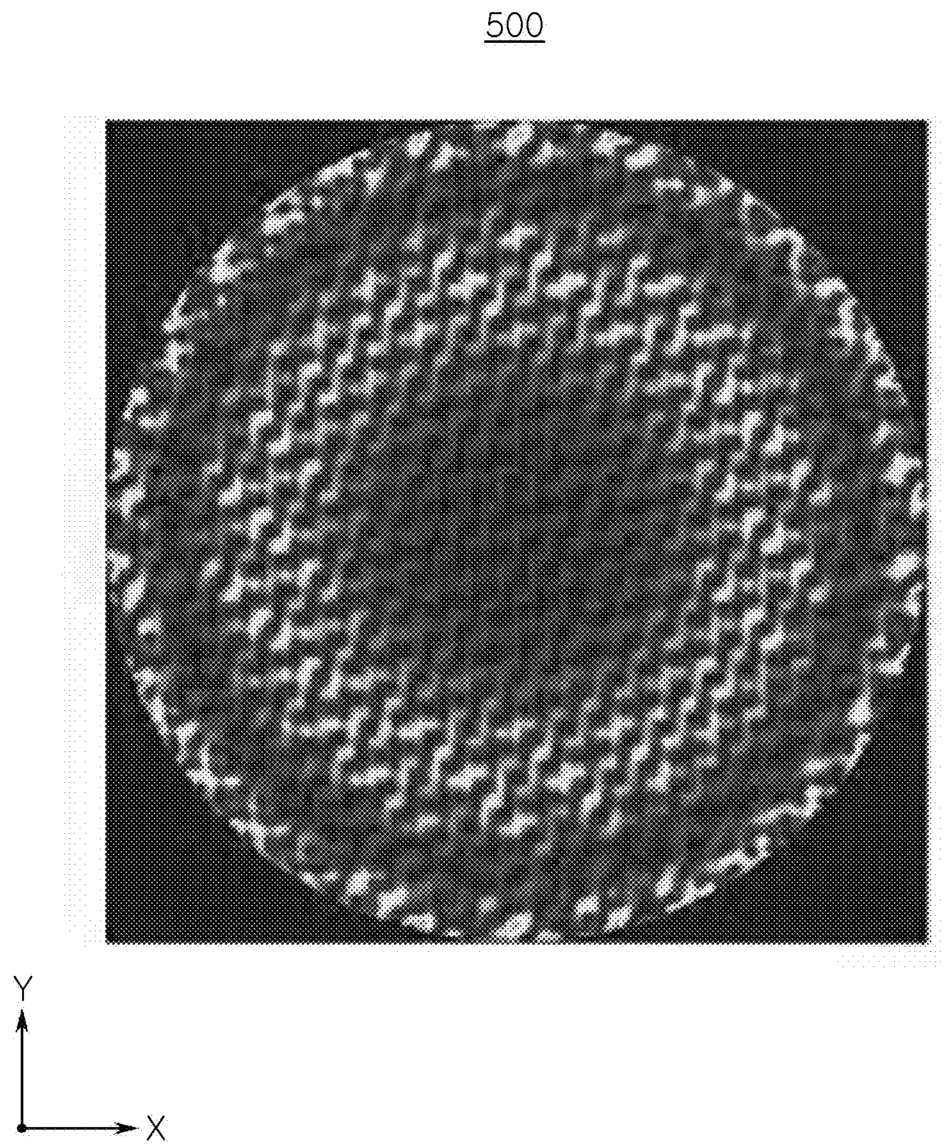
FIG. 18 is a diagram illustrating an original image obtained by a semiconductor measurement apparatus according to an example embodiment of the present disclosure.

FIG. 18 is a diagram illustrating an original image obtained by a semiconductor measurement apparatus according to an example embodiment.

As described above, the original image 500 generated by the image sensor may be a multiple-interference image. Each of a lighting unit irradiating light on the sample and an optical unit transmitting light reflected from the sample to the image sensor may include polarization elements, and each polarization element may be implemented as a beam displacer or compensator.

Accordingly, as described above with reference to FIGS. 8 to 17, the light passing through the lighting unit and the optical unit may be decomposed into a plurality of polarization components travelling at different positions on a plane parallel to the light receiving surface of the image sensor. When incident to the image sensor, a plurality of polarization components may interfere with each other, and the image sensor may generate a multiple-interference image representing interference patterns of the plurality of polarization components, as illustrated in FIG. 18.

The original image 500 according to the example embodiment illustrated in FIG. 18 may be an image obtained by imaging one time by an image sensor included in a semiconductor measurement apparatus. The original image 500 may be represented on a plane corresponding to the back focal plane of the objective lens disposed adjacent to the sample, and as described above with reference to FIG. 7, coordinates of each pixel included in the original image 500 may be determined by the azimuth angle and the incident angle of light.

The original image 500 generated by the image sensor may be transmitted to a control unit of a semiconductor measurement apparatus, and the control unit may process the original image 500 and may obtain the plurality of pieces of polarization information. For example, the control unit may obtain a plurality of pieces of polarization information by processing the original image 500 without applying a Fourier transform to the original image 500 and transforming the original image 500 into a frequency domain. A plurality of pieces of polarization information obtained by the control unit may include an intensity difference, a phase difference, and a degree of polarization of polarization components included in light incident to the image sensor.

Figure 19:
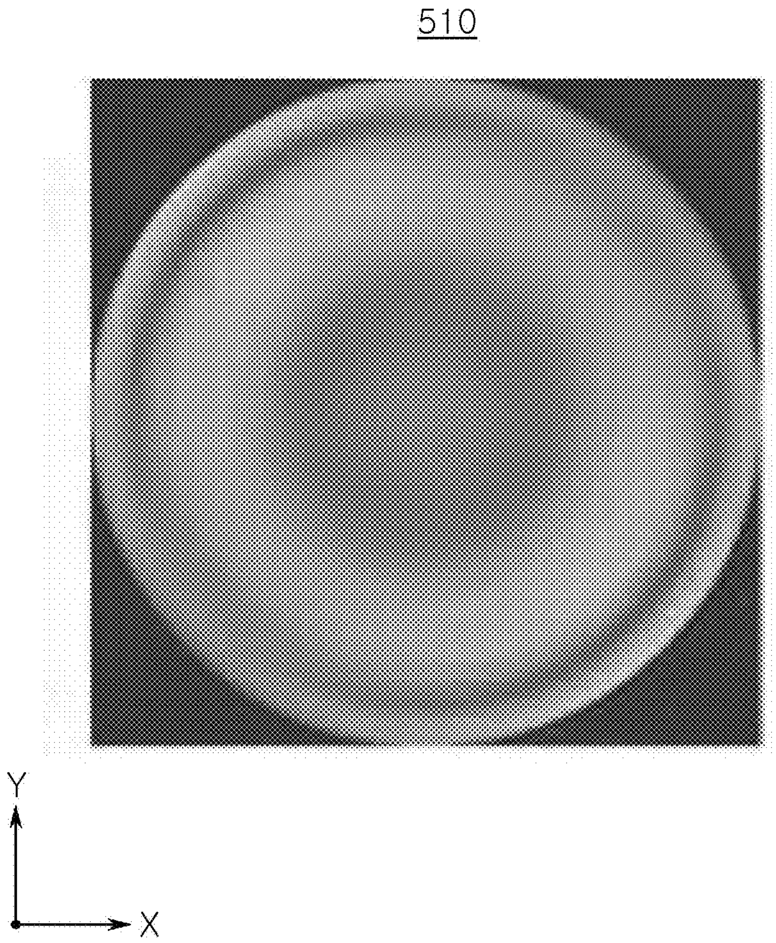
FIGS. 19, 20, and 21 are diagrams illustrating operations of a semiconductor measurement apparatus according to an example embodiment of the present disclosure.
Figure 20:
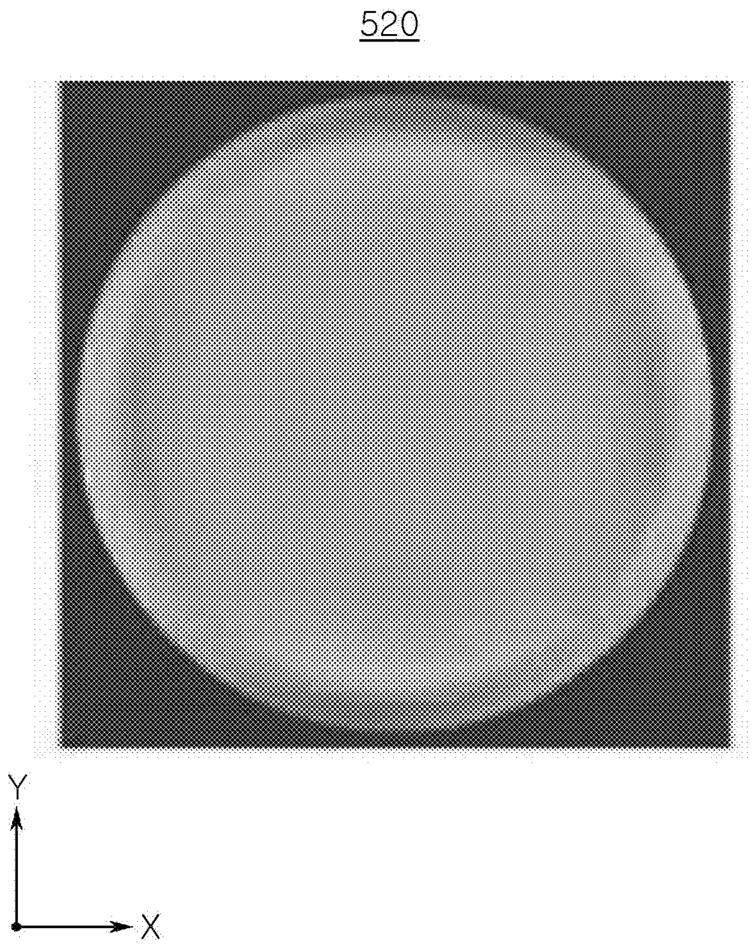
Figure 21:
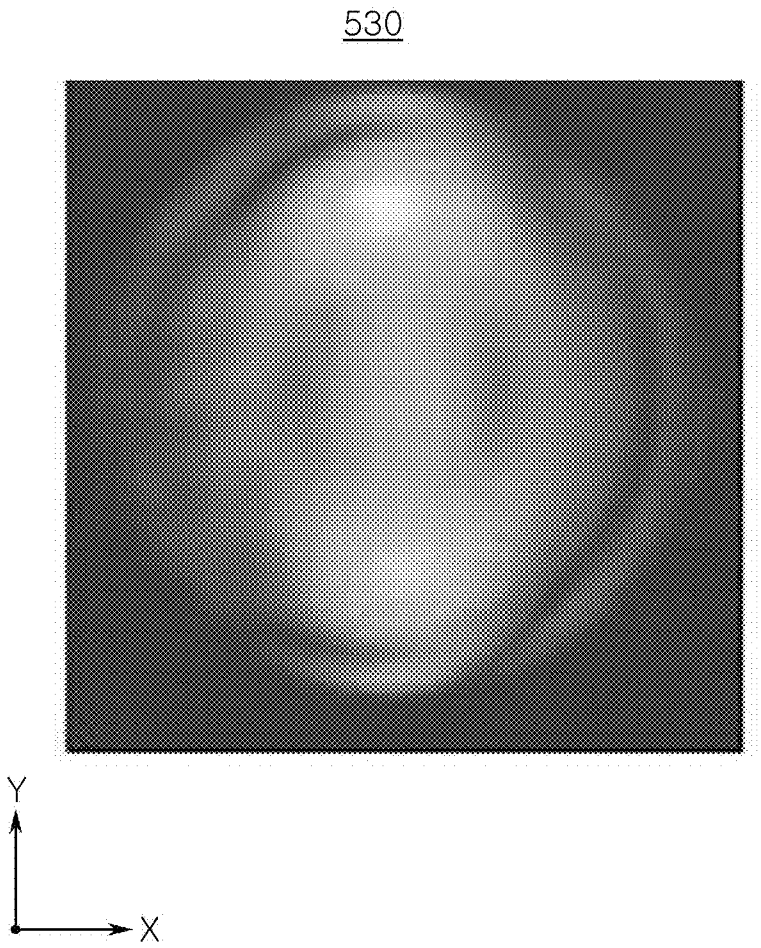

FIGS. 19 to 21 are diagrams illustrating operations of a semiconductor measurement apparatus according to an example embodiment.

FIG. 19 is a diagram illustrating a first image 510 extracted from the original image 500 illustrated in FIG. 18, and the first image 510 may be an image representing an intensity difference of polarization components included in the light incident to the image sensor in the X-Y plane. The X-Y plane may be a plane corresponding to the back focal plane of the objective lens, and may be a plane parallel to the sample reflecting the light output by the lighting unit, for example.

The second image 520 illustrated in FIG. 20 may be an image representing the phase difference of polarization components included in the light incident to the image sensor in the X-Y plane, and a third image 530 illustrated in FIG. 21 may be an image representing the degree of polarization of light incident to an image sensor in an X-Y plane. As described above with reference to FIG. 7, each coordinate in the X-Y plane may be defined according to an incident angle and an azimuth angle of light passing through the objective lens disposed on the sample.

For example, in each of the first to third images 510 to 530, a position of each of a plurality of pixels disposed on the X-Y plane may be defined as polar coordinates as described above with reference to FIG. 7. A radius value of polar coordinates may be defined according to the incident angle of light, and the angular value of polar coordinates may be determined by the azimuth angle of light. Accordingly, coordinates of each pixel may be defined according to the incident angle and the azimuth angle of light passing through the objective lens.

In the example embodiment, since light passing through an objective lens having a large numerical aperture is incident to the sample and reflected, first to third images 510-530, including information such as an intensity difference, a phase difference, and a degree of polarization of polarization components of light over a wide incident angle and full azimuth angle (0 to 360 degrees) may be extracted from the original image 500 obtained by imaging one time. Accordingly, the time required for measurement operation may be shortened.

Also, in the example embodiment, a plurality of pieces of polarization information may be obtained from the original image 500 using a compression sensing method without an operation of converting the original image 500 into a frequency domain. In an example embodiment, the plurality of pieces of polarization information may be elements of a Mueller matrix. In the method of converting the original image 500 into the frequency domain and interpreting the image, data loss in a high frequency band may occur in the process of inversely transforming the signal converted into the frequency domain after filtering the signal. Different from the configuration, in the example embodiment, the plurality of pieces of polarization information may be extracted from the original image 500 without conversion to the frequency domain, and the selected dimension to be measured may be more accurately determined from the structure of the sample.

Figure 22:
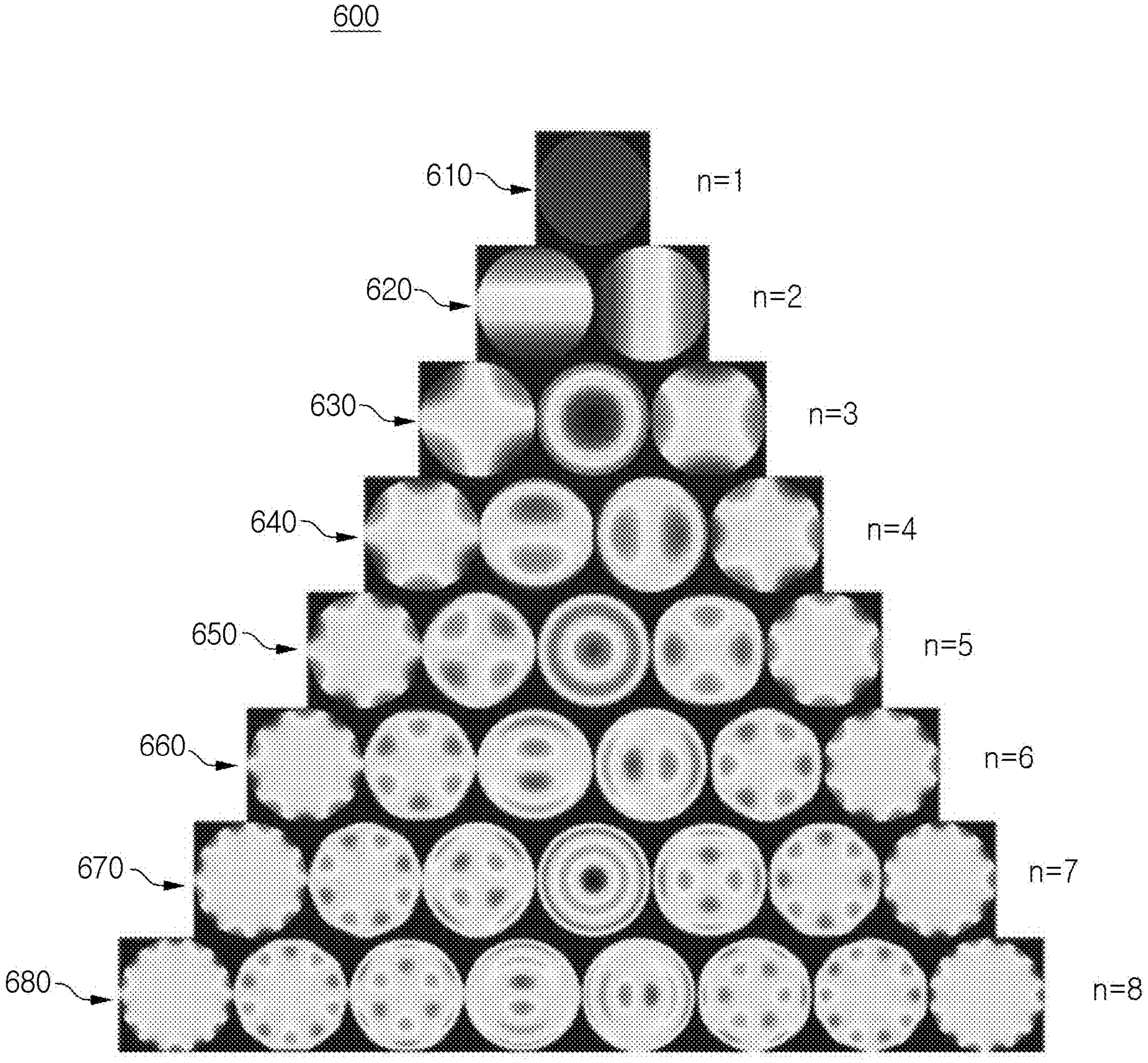
FIG. 22 is a diagram illustrating a plurality of bases used in a semiconductor measurement apparatus according to an example embodiment of the present disclosure.
Figure 23:
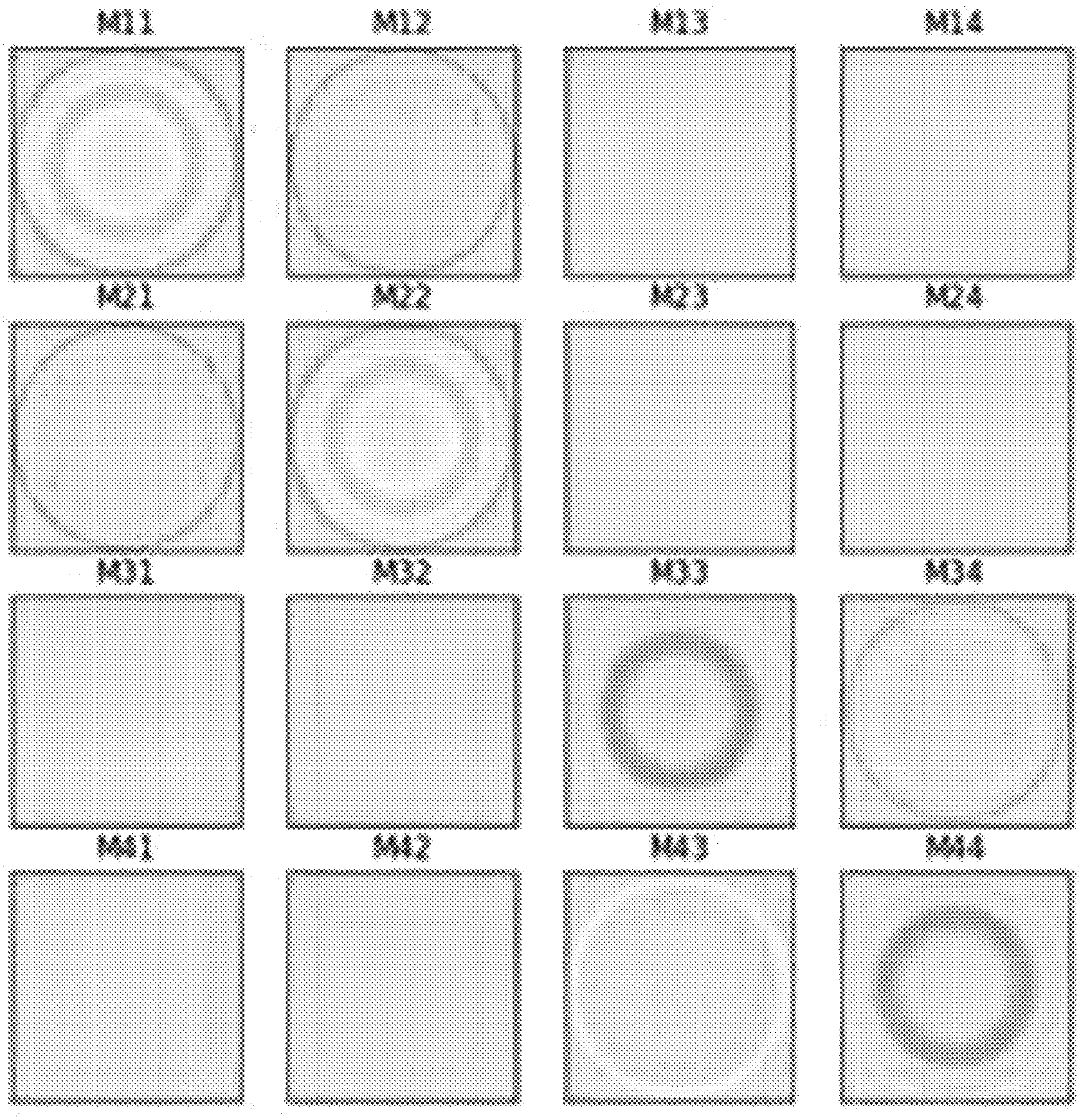
FIG. 23 is a diagram illustrating a plurality of pieces of polarization information generated by a semiconductor measurement apparatus according to an example embodiment of the present disclosure.

FIG. 22 is a diagram illustrating a plurality of bases used in a semiconductor measurement apparatus according to an example embodiment. FIG. 23 is a diagram illustrating a plurality of pieces of polarization information generated in a semiconductor measurement apparatus according to an example embodiment.

As described above, in the example embodiment, pieces of polarization information may be extracted from an original image using a compression sensing method without conversion to a frequency domain. A control unit of a semiconductor measurement apparatus according to an example embodiment may receive an original image, which is a self-interference image, from an image sensor, and may construct a prediction equation representing the original image. For example, the prediction equation may include a plurality of pieces of polarization information and spatial frequency carriers. In an example embodiment, the prediction equation may be based on Equation 1 below.

[Equation 1]

$$I \cong \frac{M_{11}}{4} + \frac{1}{32}(M_{33} - M_{34})\cos(6ay) - \frac{1}{32}(M_{34} + M_{43})\sin(6ay) + \ldots$$

In Equation 1, I is an original image, and a plurality of pieces of polarization information Mij included in the prediction equation may be elements of a Mueller matrix. A Mueller matrix may be configured to process the Stokes vector representing the polarization components of light, and may include 16 elements. As an example, a relationship between a plurality of pieces of polarization information and a spatial frequency carrier may be matched as illustrated in Table 1 below.

TABLE 1

| | X | Y | Real number portion | Imaginary number portion |
|---|---|---|---|---|
| 1 | 0 | 6y | $\frac{1}{32(M_{33} - M_{44})}$ | $-\frac{1}{32(M_{34} - M_{43})}$ |
| 2 | 2x | 4y | 1/32 2M_23 − M_33 + M_44) | $\frac{1}{32(-2M_{24} + M_{34} + M_{43})}$ |
| 3 | 0 | 4y | $\frac{1}{8}M_{31}$ | $-\frac{1}{8}M_{41}$ |
| 4 | x | 3y | 1/16 2M_22 + M_32) | $-\frac{1}{16}M_{42}$ |
| 5 | 4x | 2y | −1/32 2M_23 + M_33 + M_44) | 1/32 2M_24 + M_34 + M_43) |
| 6 | 2x | 2y | $\frac{1}{4}M_{21}$ | 0 |
| 7 | 0 | 2y | 1/32 4M_13 − 2M_23 + M_33 + M_44) | −1/32 4M_14 + 2M_24 − M_34 + M_43) |

TABLE 1-continued

| | X | Y | Real number portion | Imaginary number portion |
|---|---|---|---|---|
| 8 | 3x | y | 1/16 2M_22 − M_32) | $-\frac{1}{16}M_{42}$ |
| 9 | 6x | 0 | $\frac{1}{32(M_{33}+M_{44})}$ | $-\frac{1}{32(M_{34}-M_{43})}$ |
| 10 | 4x | 0 | $-\frac{1}{8}M_{31}$ | $-\frac{1}{8}M_{41}$ |
| 11 | 2x | 0 | 1/32 4M_13 − 2M_23 − M_33 + M_44) | 1/32 4M_14 + 2M_24 + M_34 + M_43) |
| 12 | 5x | -y | $-\frac{1}{16}M_{32}$ | $-\frac{1}{16}M_{42}$ |
| 13 | x | -y | $\frac{1}{4}M_{12}$ | 0 |
| 14 | 4x | −2y | $-\frac{1}{32(M_{33}-M_{44})}$ | $-\frac{1}{32(M_{34}+M_{43})}$ |
| 15 | 2x | −4y | $-\frac{1}{32}(M_{33}+M_{44})$ | $\frac{1}{32(M_{34}-M_{43})}$ |
| 16 | x | −5y | $\frac{1}{16}M_{32}$ | $\frac{1}{16}M_{42}$ |

Accordingly, when the elements of the Mueller matrix are determined using the prediction equation, polarization characteristics of light incident to the image sensor may be analyzed based on the elements. However, elements of the Mueller matrix, that is, a plurality of pieces of polarization information, may not be defined only with the prediction equation defined by Equation 1. Accordingly, in the example embodiment, a Zernike polynomial may be used to determine a plurality of pieces of polarization information.

The control unit of the semiconductor measurement apparatus may represent each element of the Mueller matrix by approximating the elements as a polynomial comprising bases of the Zernike polynomial and coefficients. The representation of each element of the Mueller matrix as a polynomial comprising bases of the Zernike polynomial and coefficients may be understood as a process of orthogonal decomposition of the elements of the Mueller matrix. As an example, the bases of the Zernike polynomial may be illustrated in FIG. 22, which includes a plurality of bases 600 according to the Zernike polynomial and may be divided according to order.

For example, the plurality of bases 600 may be divided into primary to eighth bases 610-680 according to order. In the example embodiment, as illustrated in Equation 2 below, a polynomial representing each element of the Mueller matrix may be defined using the plurality of bases 600 and coefficients ($s_{d1}$, $s_{d2}$, $s_{d3}$, . . . ) according to the Zernike polynomial. An element defined as a polynomial according to the example of Equation 2 may be the first element M11 of the Mueller matrix. Also, in Equation 2, the basis multiplied by the first coefficient $s_{d1}$ may be the second basis among the secondary bases of the Zernike polynomial, and the basis multiplied by the second coefficient $s_{d2}$ may be the first basis among the secondary bases of the Zernike polynomial. The basis multiplied by the third coefficient $s_{d3}$ may be a second basis among third bases of the Zernike polynomial.

$$S_{d1}(\text{Basis}) + S_{d2}(\text{Basis}) + S_{d3}(\text{Basis}) + \ldots \cong M_d \qquad \text{[Equation 2]}$$

When each of the elements included in the Mueller matrix is approximated as a polynomial as in Equation 2, the control unit of the semiconductor measurement apparatus may determine an optimization condition to restore the plurality of pieces of polarization information. The optimization condition may be determined according to Equation 3 below.

$$\min\left(\|I - \text{estimation equation}\| + \sum_d [\![s_d)]\!]\right) \qquad \text{[Equation 3]}$$

Referring to Equation 3, the optimization condition may be a condition in which the result of adding the difference between the prediction equation and the original image I to the sum of the coefficients (sd) included in the polynomial approximating each element of the Mueller matrix has a minimum value. The control unit of the semiconductor measurement apparatus, according to the optimization condition defined in Equation 3, may determine that the difference between the original image I and the prediction equation may not be relatively large, and among the coefficients $s_d$ included in the polynomial, each value of coefficients $s_d$ may be determined such that the number of coefficients having a non-zero value is minimized. Coefficients $s_d$ determined according to optimization conditions may be defined as optimization coefficients.

The control unit may restore each of the plurality of pieces of polarization information by reflecting optimization coefficients in Equation 2, and as described above, the plurality of pieces of polarization information may be a plurality of elements included in a Mueller matrix. As an example, the control unit may determine 16 elements M11-M44 of the Mueller matrix as illustrated in FIG. 23, and each of the elements M11-M44 may be represented as data of an image format represented on the same plane as the original image.

As illustrated in FIG. 23, when elements M11-M44 of the Müller matrix are determined, the control unit may determine the selected dimension of the structure formed in the region in which light is reflected in the sample using the elements. The control unit may completely analyze the polarization characteristics of light incident to the image sensor using elements M11-M44 of the Mueller matrix, and may determine the selected dimension using the characteristics.

As described above, each pixel of the original image may correspond to a specific azimuth angle and a specific incident angle. Accordingly, the control unit may calculate measurement parameters representing the polarization characteristics of light at a specific azimuth angle and a specific incident angle using the pieces of polarization information obtained by applying the compression sensing method to the original image. As an example, the measurement parameters may obtain an intensity difference between polarization components included in light incident to an image sensor, a phase difference between polarization components, and a degree of polarization. The control unit may determine the selected dimension by selecting a measurement parameter having the highest sensitivity for the selected dimension to be measured, among various measurement parameters.

The control unit may accurately determine the selected dimension to be measured by comparing the above measurement parameters with reference data pre-stored in the library or by inputting the parameters to a pre-learned machine learning model. For example, the machine learning model may be trained in advance such that the control unit may receive a measurement parameter calculated by applying a compression sensing method to an original image and may output a value of a specific dimension.

Also, in the example embodiment, the control unit may determine the selected dimension by comparing at least one element among the elements M11 to M44 of the Mueller matrix derived as illustrated in FIG. 23 with reference image data stored in the library. In this case, library data may store elements of a Mueller matrix generated differently from an original image according to a value of a selected dimension as image format data.

In the example embodiment, at various incident angles and azimuth angles, the selected dimension may be determined by using intensity difference, phase difference, and degree of polarization of polarization components included in light incident to the image sensor as measurement parameters. Accordingly, only the selected dimension to be measured in fine structures in which interaction between different dimensions, such as width and height, affects each other may be accurately determined.

To accurately measure the selected dimension, in the example embodiment, original images may be obtained while irradiating light of various wavelength bands to the sample. For example, as described above with reference to FIGS. 1 to 4, the lighting unit of the semiconductor measurement apparatus may include a monochromator connected to a light source. The control unit may control the monochromator to obtain a plurality of original images while irradiating light of different wavelength bands on the sample, and may apply the compression sensing method to each of the plurality of original images. Accordingly, measurement parameters may be obtained in a wide wavelength band by imaging performed multiple times, and using the parameters, the selected dimension may be determined more accurately.

Figure 24:
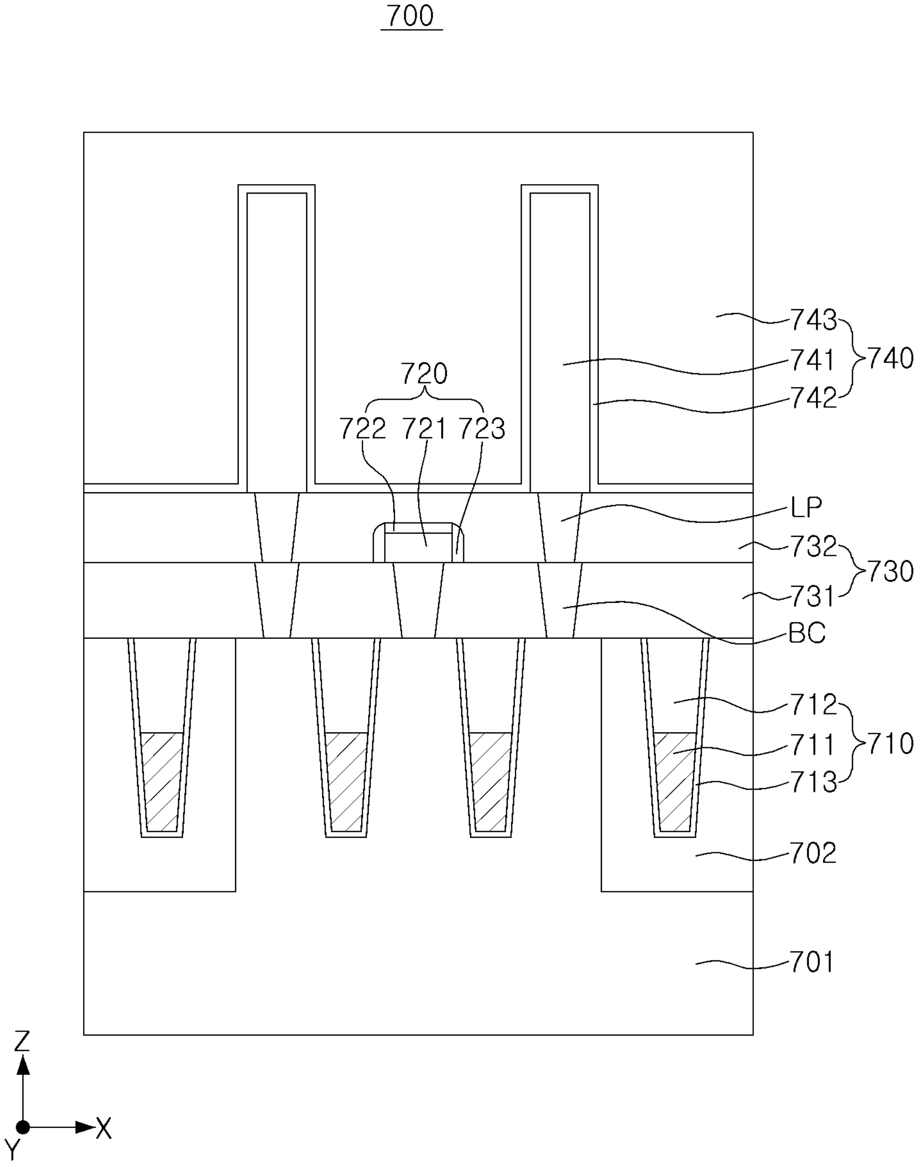
FIGS. 24 and 25 are diagrams illustrating a method of operating a semiconductor measurement apparatus according to an example embodiment of the present disclosure.
Figure 25:
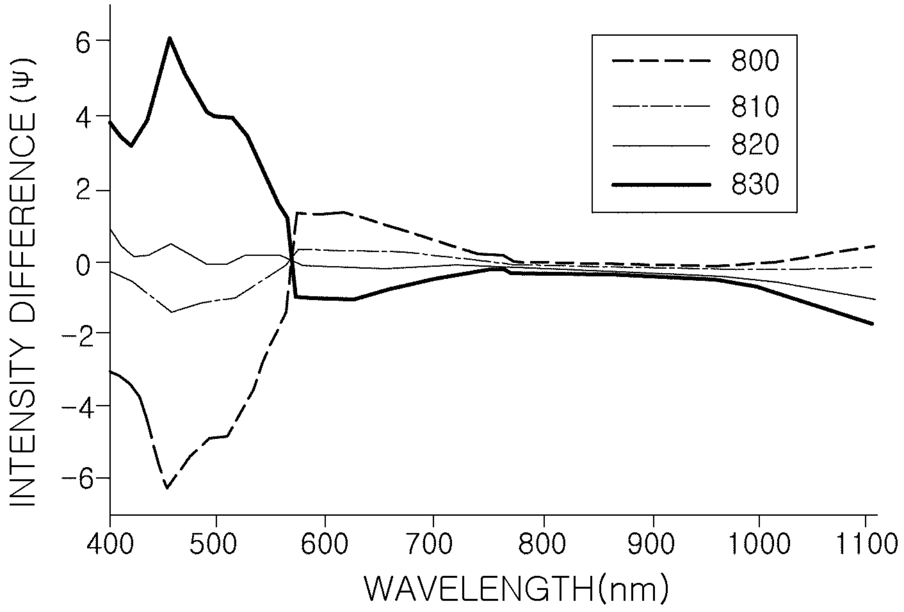

FIGS. 24 and 25 are diagrams a method of operating a semiconductor measurement apparatus according to an example embodiment.

FIG. 24 is a diagram illustrating a partial region of a sample including a structure to be measured using a semiconductor measurement apparatus. For example, in the example embodiment illustrated in FIG. 24, the sample may be a wafer on which a semiconductor device 700 including memory cells for storing data is formed. Each of the memory cells may include a switch element and a cell capacitor, and the memory cells may be implemented as a dynamic random access memory (DRAM) apparatus.

Referring to FIG. 24, a semiconductor device 700 may include a substrate 701 including a semiconductor material, a gate structure 710, a bitline structure 720, an interlayer insulating layer 730, and a cell capacitor 740. In the substrate 701, an isolation region 702 defining an active region may be formed of an insulating material, and a gate structure 710 may be formed in a structure buried in the substrate 701.

The gate structure 710 may include a gate electrode layer 711, a capping layer 712 and a gate insulating layer 713. In example embodiments, the gate electrode layer 711 may have a multilayer structure formed of a plurality of different conductive materials, for example, metal materials, and may provide a wordline. The capping layer 712 may be formed of polysilicon, silicon nitride, silicon oxide, silicon oxynitride, silicon carbonitride, silicon oxycarbonitride, or the like. The gate insulating layer 713 may be formed of a high-k material having a higher dielectric constant than silicon oxide, silicon nitride, or the like. A channel region may be formed in a region adjacent to the gate electrode layer 711 in the substrate 701.

An interlayer insulating layer 730 may be disposed on the substrate 701. The interlayer insulating layer 730 may include a lower interlayer insulating layer 731 and an upper interlayer insulating layer 732. An active region adjacent to the gate structure 710 may be connected to a buried contact BC extending into the lower interlayer insulating layer 731, and the buried contact BC may be connected to a landing pad LP extending into the upper interlayer insulating layer 732. The buried contact BC connected to the active region between adjacent gate structures 710 may be connected to the bitline structure 720. The bitline structure 720 may include a conductive layer 721, a capping layer 722 and a spacer 723.

A cell capacitor 740 extending in the first direction (Z-axis direction) may be connected to an upper portion of the landing pad LP. The cell capacitor 740 may include a lower electrode 741, a capacitor dielectric layer 742 and an upper electrode 743, and the shape of the lower electrode 741 may have a shape other than the pillar shape illustrated in FIG. 24. The lower electrode 741 may be formed of a metal or metal compound, and the upper electrode 743 may be formed of a doped semiconductor material such as silicon germanium (SiGe).

In the manufacturing process of the semiconductor device 700, for example, the buried contact BC may be formed by removing a portion of the region of the first interlayer insulating layer 731 and filling the removed region with a conductive material. As the gap between the gate structures 710 decreases and as integration density of the semiconductor device 700 increases, it may be desirable to precisely specify the position of the buried contact BC and to precisely control a dimension thereof in order to prevent defects.

FIG. 25 may be a graph illustrating measurement parameters calculated from the original image of a semiconductor device 700 including buried contacts BC having different heights using a semiconductor measurement apparatus according to an example embodiment. In the example embodiment described with reference to FIG. 25, an image sensor of a semiconductor measurement apparatus may generate a multiple-interference image as an original image, and an intensity difference of polarization components included in light incident to the image sensor may be calculated as a measurement parameter.

FIG. 25 illustrates first to fourth graphs 800-830, and each of the first to fourth graphs 800-830 may be matched to the buried contacts BC having different heights. Each of the first to fourth graphs 800-830 may represent the result of irradiating light of different wavelength bands to the semiconductor device 700 including the buried contact BC having a specific height and measuring the intensity difference of polarization components included in the reflected light.

For example, a first graph 800 may represent measurement parameters calculated from an original image of the semiconductor device 700 having the buried contact BC of a first height, and the second graph 810 may represent measurement parameters calculated from an original image of the semiconductor device 700 having the buried contact BC of a second height greater than the first height. A third graph 820 may represent measurement parameters calculated from an original image of the semiconductor device 700 having the buried contact BC of a third height greater than the second height, and a fourth graph 830 may represent measurement parameters calculated from an original image of the semiconductor device 700 having the buried contact BC of a fourth height greater than the second height.

A difference between the first height and the second height, a difference between the second height and the third height, and a difference between the third height and the fourth height may each be 1 nm or less. Referring to FIG. 25, in the 700 to 1000 nm wavelength band, the intensity difference of polarization components included in the light reflected from the semiconductor device 700 may not be clearly distinct regardless of the height difference of the buried contact BC. In the 400 to 500 nm wavelength band, the intensity difference of polarization components included in the light reflected from the semiconductor device 700 may be clearly distinct according to the height difference of the buried contact BC. Accordingly, using the semiconductor measurement apparatus according to the example embodiment, the dimension of the structure included in the sample may be measured with sensitivity of 0.1 nm or less, and yield of the process may be improved.

The first to fourth graphs 800 to 830 as illustrated in FIG. 25 may be obtained by irradiating samples with light of different wavelength bands using a lighting unit of a semiconductor measurement apparatus. For example, the light source of the lighting unit may emit light in a wide wavelength range, and the wavelength range of light irradiated to the sample may be changed using a monochromator connected to the light source.

When the wavelength band with high sensitivity for the selected dimension to be measured in the structure is already recognized, the measurement operation may be swiftly completed by applying the compression sensing method to the original image obtained while irradiating the sample with light in the corresponding wavelength band. For example, when measuring the height of the buried contact BC in the semiconductor device 700 as illustrated in FIG. 24, while controlling the lighting unit to output light in the 450 nm wavelength band, an original image may be obtained, and the intensity difference of the polarization components may be obtained by applying the compression sensing method to the original image.

Also, in the example embodiment, the height of the buried contact BC may be measured using spectral data representing the distribution of measurement parameters obtained while irradiating light of a wide wavelength band. For example, as illustrated in FIG. 25, the control unit may obtain the plurality of original images while irradiating light in a wavelength band of 400 to 1100 nm, and may determine the height of the buried contact BC by comparing spectral data representing the distribution of measurement parameters calculated from each of the plurality of original images with reference data generated in advance.

According to the aforementioned example embodiments, an original image corresponding to an azimuth angle of 0 degrees to 360 degrees may be obtained by imaging one time, and a prediction equation representing the original images may be generated with a plurality of pieces of polarization information. In the prediction equation, a plurality of pieces of polarization information may be represented by a plurality of bases and a plurality of coefficients, respectively, and optimization coefficients for a plurality of coefficients may be determined under an optimization condition in which the difference between the sum of the plurality of coefficients and the original image and the prediction equation is minimized. A plurality of pieces of polarization information may be generated using optimization coefficients, and the dimension may be accurately determined based on the information, and regardless of the interaction of dimensions affecting each other in the process, the dimension to be measured may be accurately determined.

While the example embodiments have been illustrated and described above, it will be configured as apparent to those skilled in the art that modifications and variations may be made without departing from the scope in the example embodiments as defined by the appended claims.

What is claimed is:

1. A semiconductor measurement apparatus, comprising:

a lighting unit comprising a light source and at least one lighting polarization element on a first travel path of light emitted by the light source;

a light receiving unit comprising at least one light receiving polarization element on a second travel path of travel of light that passes through the at least one lighting polarization element and that is reflected from a sample, wherein the light receiving unit comprises an image sensor configured to receive the light passing through the at least one light receiving polarization element and to output an original image; and a control unit configured to:

generate a prediction equation representing the original image, wherein the prediction equation is based on a plurality of elements of a Mueller matrix, approximate each of the plurality of elements of the Mueller matrix to a polynomial comprising bases of a Zernike polynomial and coefficients, determine optimization coefficients based on an optimization condition in which a number of the coefficients having a non-zero value is minimized, determine the plurality of elements of the Mueller matrix using the bases of the Zernike polynomial and the optimization coefficients, and analyze polarization characteristics of light incident to the image sensor using the plurality of elements of the Mueller matrix and determine a selected dimension using the polarization characteristics.

2. The semiconductor measurement apparatus of claim 1, wherein the control unit is configured to:

determine the selected dimension based on at least one element among the plurality of elements of polarization information.

3. The semiconductor measurement apparatus of claim 2, wherein the control unit is configured to:

determine a measurement parameter based on the at least one element among the plurality of elements of polarization information, and determine the selected dimension based on a comparison between the measurement parameter and a reference parameter.

4. The semiconductor measurement apparatus of claim 3, wherein the measurement parameter includes an intensity difference of polarization components of light incident to the image sensor, a phase difference of the polarization components, and a degree of polarization (DOP).

5. The semiconductor measurement apparatus of claim 3, wherein the control unit is configured to:

define an azimuth angle, an incident angle, and a wavelength band of light reflected from the sample and incident to the image sensor, and determine the selected dimension based on the measurement parameter corresponding to the azimuth angle, the incident angle, and the wavelength band of each of the plurality of elements.

6. The semiconductor measurement apparatus of claim 3, wherein the measurement parameter is selected from among a plurality of measurement parameters associated with the selected dimension, and wherein the measurement parameter has a highest sensitivity from among the plurality of measurement parameters.

7. The semiconductor measurement apparatus of claim 1,
wherein each of the plurality of elements is image data, and
wherein the control unit is configured to determine the selected dimension based on a comparison between the plurality of elements and reference image data.

8. The semiconductor measurement apparatus of claim 1, further comprising:
an objective lens on the second travel path of light,
wherein a numerical aperture of the objective lens is greater than or equal to 0.95 and less than 1.0.

9. The semiconductor measurement apparatus of claim 8, wherein an incident angle of light reflected from the sample and incident to the objective lens is greater than or equal to 0 degrees and less than 85 degrees.

10. The semiconductor measurement apparatus of claim 8, wherein a surface of the image sensor is in a conjugate position with respect to a position of a back focal plane of the objective lens.

11. The semiconductor measurement apparatus of claim 1, wherein the control unit is configured to determine whether the optimization condition in which a calculation result obtained by adding a difference between the original image and the prediction equation and a sum of the coefficients is minimized.

12. The semiconductor measurement apparatus of claim 1,
wherein the lighting unit comprises a first lighting polarization element and a second lighting polarization element, and
wherein the light receiving unit comprises a first light receiving polarization element and a second light receiving polarization element.

13. The semiconductor measurement apparatus of claim 12, wherein each of the first lighting polarization element, the second lighting polarization element, the first light receiving polarization element and the second light receiving polarization element includes a respective pair of beam displacers.

14. The semiconductor measurement apparatus of claim 1, wherein at least one of the at least one lighting polarization element and the at least one light receiving polarization element comprises a compensator, and wherein the compensator comprises a polarizer and a ¼ wave plate.

15. The semiconductor measurement apparatus of claim 1, wherein the at least one lighting polarization element is configured to separate the light emitted by the light source into first, second, third, and fourth polarization components,
wherein the at least one light receiving polarization element is configured to separate the light that passes therethrough into first, second, third, and fourth polarization components, and
wherein the image sensor receives the first, second, third, and fourth polarization components of the light passing through the at least one light receiving polarization element.

16. A semiconductor measurement apparatus, comprising:
a lighting unit configured to emit a light to a sample;
an optical unit on a path of the light reflected by the sample and including an objective lens proximate to the sample;
an image sensor configured to receive the light through the optical unit and generate a self-interference image by interference of polarization components of the light; and
a control unit configured to:
generate a restored image similar to the self-interference image using a prediction equation, wherein the prediction equation is based on a plurality of elements of a Mueller matrix;
define polynomials representing the plurality of elements of the Mueller matrix, respectively, wherein each of the polynomials includes coefficients and bases of a Zernike polynomial;
determine optimization coefficients for coefficients to satisfy a condition in which a number of the coefficients having a non-zero value is minimized;
determine measurement parameters including at least one of an intensity between the polarization components, a phase difference between the polarization components, and a degree of polarization of the light, using the plurality of elements of the Mueller matrix; and
determine a selected dimension from the sample using the measurement parameters.

17. The semiconductor measurement apparatus of claim 16, wherein coordinates of each pixel of the self-interference image comprise a first component corresponding to a distance from an optical axis of the light and a second component corresponding to an angle that is based on a reference axis that is parallel to a surface of the sample, and
wherein the control unit is configured to determine the first component based on an incident angle of light incident to the objective lens, and the control unit is configured to determine the second component based on an azimuth angle of light incident to the objective lens.

18. The semiconductor measurement apparatus of claim 16, wherein the lighting unit emits the light having multiple wavelength bands, and
wherein the control unit determines the selected dimension using spectral data representing distribution of one of the measurement parameters, according to the multiple wavelength bands.

19. The semiconductor measurement apparatus of claim 16, wherein the control unit determines the selected dimension without a calculation operation of converting the self-interference image into a frequency domain.

20. The semiconductor measurement apparatus of claim 16, wherein the lighting unit includes a light source and at least one lighting polarization element to separate the light emitted by the light source into first, second, third, and fourth polarization components,
wherein the optical unit includes at least one light receiving polarization element to separate the light reflected by the sample into first, second, third, and fourth polarization components, and
wherein the image sensor receives the first, second, third, and fourth polarization components of the light passing through the at least one light receiving polarization element.

* * * * *